United States Patent
Park et al.

(10) Patent No.: US 9,335,853 B2
(45) Date of Patent: May 10, 2016

(54) DISPLAY DEVICE INCLUDING SENSOR UNITS AND DRIVING METHOD THEREOF

(75) Inventors: Kyung-Ho Park, Asan-si (KR); Bong Hyun You, Yongin-si (KR); Jae-Sung Bae, Suwon-si (KR); Sang-Je Lee, Cheonan-si (KR); Dong-Won Park, Hwaseong-si (KR); Dong-Hyun Yoo, Asan-si (KR); Jae-Won Kim, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 621 days.

(21) Appl. No.: 13/404,714

(22) Filed: Feb. 24, 2012

(65) Prior Publication Data
US 2013/0044092 A1 Feb. 21, 2013

(30) Foreign Application Priority Data

Aug. 16, 2011 (KR) .................. 10-2011-0081313

(51) Int. Cl.
*G06F 3/041* (2006.01)
*G09G 3/20* (2006.01)
*G09G 3/34* (2006.01)

(52) U.S. Cl.
CPC ............ *G06F 3/0412* (2013.01); *G06F 3/0416* (2013.01); *G09G 3/20* (2013.01); *G09G 3/34* (2013.01); *G09G 2300/023* (2013.01); *G09G 2300/0426* (2013.01); *G09G 2354/00* (2013.01); *G09G 2370/24* (2013.01)

(58) Field of Classification Search
USPC ........................................ 345/173
See application file for complete search history.

(56) References Cited

U.S. PATENT DOCUMENTS

| | | | |
|---|---|---|---|
| 7,999,796 B2 * | 8/2011 | Lee et al. ................. | 345/174 |
| 2004/0051724 A1 | 3/2004 | Elliott et al. | |
| 2004/0246404 A1 | 12/2004 | Elliott et al. | |
| 2005/0094078 A1 | 5/2005 | Kang | |
| 2007/0290971 A1 * | 12/2007 | Shih et al. ................ | 345/90 |
| 2009/0219277 A1 * | 9/2009 | Teranishi et al. ......... | 345/214 |
| 2010/0039406 A1 * | 2/2010 | Lee et al. ................. | 345/174 |
| 2011/0018790 A1 | 1/2011 | Lee | |
| 2011/0102389 A1 * | 5/2011 | Park et al. ................ | 345/205 |
| 2011/0267283 A1 * | 11/2011 | Chang et al. ............. | 345/173 |
| 2011/0310035 A1 * | 12/2011 | Kim et al. ................ | 345/173 |
| 2011/0310036 A1 * | 12/2011 | Juan et al. ................ | 345/173 |
| 2012/0127413 A1 * | 5/2012 | Shin et al. ................ | 349/139 |
| 2012/0229408 A1 * | 9/2012 | Yamamoto ................ | 345/173 |

FOREIGN PATENT DOCUMENTS

| | | | | |
|---|---|---|---|---|
| CN | 101281315 A | * 10/2008 | ............. | G02F 1/133 |
| JP | 05-119344 | 5/1993 | | |
| KR | 10-2005-0113853 | 12/2005 | | |
| KR | 10-2008-0060948 | 7/2008 | | |
| KR | 10-2009-0065110 | 6/2009 | | |
| KR | 10-2009-0073903 | 7/2009 | | |

* cited by examiner

*Primary Examiner* — Kwang-Su Yang
(74) *Attorney, Agent, or Firm* — H.C. Park & Associates, PLC

(57) ABSTRACT

Exemplary embodiments of the present invention provide a display device including a plurality of sensing unit groups consisting of a plurality of sensing units and arranged in a matrix form. The display device further includes a plurality of gate lines connected to the plurality of sensing units included in a first sensing unit group, at least one sensing signal line connected to the plurality of sensing units, a scan driver transmitting gate signals to the gate lines, and a sensing signal processor processing a sensing signal transmitted by the sensing signal line. The gate lines transmit the gate signals according to different gate clock signals.

29 Claims, 21 Drawing Sheets

FIG. 15

| TB1 | Da1 | Da3 | Da2 | Da4 | Da1 | Da3 | Da2 | Da4 | ⋯ |
|---|---|---|---|---|---|---|---|---|---|
| | Da5 | Da7 | Da6 | Da8 | Da5 | Da7 | Da6 | Da8 | ⋯ |
| | ⋮ | ⋮ | ⋮ | ⋮ | ⋮ | ⋮ | ⋮ | ⋮ | ⋱ |

⇩

| TB2 | Da1 | Da1 | Da1 | Da1 | ⋯ |
|---|---|---|---|---|---|
| | Da2 | Da2 | Da2 | Da2 | ⋯ |
| | Da3 | Da3 | Da3 | Da3 | ⋯ |
| | ⋮ | ⋮ | ⋮ | ⋮ | ⋱ |

FIG. 16

| TB1 | Db2 | Db4 | Db1 | Db3 | Db2 | Db4 | Db1 | Db3 | ⋯ |
|---|---|---|---|---|---|---|---|---|---|
| | Db6 | Db8 | Db5 | Db7 | Db6 | Db8 | Db5 | Db7 | ⋯ |
| | ⋮ | ⋮ | ⋮ | ⋮ | ⋮ | ⋮ | ⋮ | ⋮ | ⋱ |

⇩

| TB2 | Db1 | Db1 | Db1 | Db1 | ⋯ |
|---|---|---|---|---|---|
| | Db2 | Db2 | Db2 | Db2 | ⋯ |
| | Db3 | Db3 | Db3 | Db3 | ⋯ |
| | ⋮ | ⋮ | ⋮ | ⋮ | ⋱ |

FIG. 17

| TB1 | Dc2 | Dc4 | Dc1 | Dc3 | Dc2 | Dc4 | Dc1 | Dc3 | ... |
|---|---|---|---|---|---|---|---|---|---|
| | Dc6 | Dc8 | Dc5 | Dc7 | Dc6 | Dc8 | Dc5 | Dc7 | ... |
| | ⋮ | ⋮ | ⋮ | ⋮ | ⋮ | ⋮ | ⋮ | ⋮ | ⋱ |

⇩

| TB2 | Dc1 | Dc1 | Dc1 | Dc1 | ... |
|---|---|---|---|---|---|
| | Dc2 | Dc2 | Dc2 | Dc2 | ... |
| | Dc3 | Dc3 | Dc3 | Dc3 | ... |
| | ⋮ | ⋮ | ⋮ | ⋮ | ⋱ |

FIG. 18

| TB1 | Dd1 | Dd3 | Dd2 | Dd4 | Dd1 | Dd3 | Dd2 | Dd4 | ... |
|---|---|---|---|---|---|---|---|---|---|
| | Dd5 | Dd7 | Dd6 | Dd8 | Dd5 | Dd7 | Dd6 | Dd8 | ... |
| | ⋮ | ⋮ | ⋮ | ⋮ | ⋮ | ⋮ | ⋮ | ⋮ | ⋱ |

⇩

| TB2 | Dd1 | Dd1 | Dd1 | Dd1 | ... |
|---|---|---|---|---|---|
| | Dd2 | Dd2 | Dd2 | Dd2 | ... |
| | Dd3 | Dd3 | Dd3 | Dd3 | ... |
| | ⋮ | ⋮ | ⋮ | ⋮ | ⋱ |

DISPLAY DEVICE INCLUDING SENSOR UNITS AND DRIVING METHOD THEREOF

CROSS REFERENCE TO RELATED APPLICATION

This application claims priority from and the benefit of Korean Patent Application No. 10-2011-0081313, filed on Aug. 16, 2011, which is hereby incorporated by reference for all purposes as if fully set forth herein.

BACKGROUND OF THE INVENTION

1. Field of the Invention

Exemplary embodiments of the present invention relate to a display device having a light sensing function and a driving method.

2. Description of the Background

Various kinds of flat panel displays have been developed and used, such as display devices having a touch sensing function or an image sensing function.

When a touch screen panel sensing a contact is attached to the display device, an increase in cost, a decrease in yield due to an additional adhering process, and deterioration of luminance of the display panel may occur. Accordingly, a technology has been developed in which a sensing element configured by a thin film transistor or a capacitor is built in a display area in which images of the display device are displayed. The built-in sensing element outputs a sensing signal according to a change in the light irradiated due to an external contact and determines contact information, such as a contact position of an object, by using the sensing signal.

A light sensing element, among the sensing elements, may generate the sensing signal by using light current generated by the incident light and acquire the contact information by using the sensing signal. The light sensed by the sensing element may be light having various frequencies, such as infrared rays and visible rays. A light source sensed by the sensing element may be disposed inside the display device, for example, at a place where a backlight unit is disposed. The sensing element may be influenced by the light from an external light source other than the light from the internal light source. However, acquiring contact information using such conventional techniques has a drawback in that the contact information may not be precisely obtained.

The above information disclosed in this Background period is only for enhancement of understanding of the background of the invention and therefore it may contain information that does not form the prior art that is already known in this country to a person of ordinary skill in the art.

SUMMARY OF THE INVENTION

Exemplary embodiments of the present invention provide a display device including a sensing element having an advantage of acquiring exact contact information.

Additional features of the invention will be set forth in the description which follows, and in part will be apparent from the description, or may be learned by practice of the invention.

Exemplary embodiments of the present invention provide a display device, including a plurality of sensing unit groups, each sensing unit group including a plurality of sensing units, a plurality of gate lines respectively connected to a first plurality of sensing units of a first sensing unit group, at least one sensing signal line connected to the first plurality of sensing units, a scan driver to transmit gate signals to the plurality of gate lines, respectively, and a sensing signal processor to process a sensing signal received from the at least one sensing signal line, wherein the plurality of gate lines transmits the gate signals according to different gate clock signals from each other.

Exemplary embodiments of the present invention also provide a display device including a substrate, a first gate line and a second gate line disposed on the substrate, each of the first gate line and the second gate line including a first gate electrode, and a sensing signal line and a first source electrode disposed on the first gate line and the second gate line, wherein the sensing signal line includes a first drain electrode facing the first source electrode, and wherein the first source electrode overlaps the first gate line and the second gate line.

Exemplary embodiments of the present invention also provide a driving method of a display device including a plurality of sensing unit groups and at least one sensing signal line. Each sensing unit group includes a plurality of sensing units disposed adjacent to each other. The at least one sensing signal line is connected to a first plurality of sensing units of a first sensing unit group. The method includes resetting each of the first plurality of sensing units of the first sensing unit group by transmitting, to a plurality of gate lines, a plurality of gate signals according to different gate clock signals, and detecting light via the first plurality of sensing units of the first sensing unit group to sense light.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 15, FIG. 16, FIG. 17, and FIG. 18 are diagrams illustrating a method of processing sensing signals provided by a plurality of sensing elements included in a display device according to exemplary embodiments of the present invention.

DETAILED DESCRIPTION OF THE ILLUSTRATED EMBODIMENTS

Figure 1:
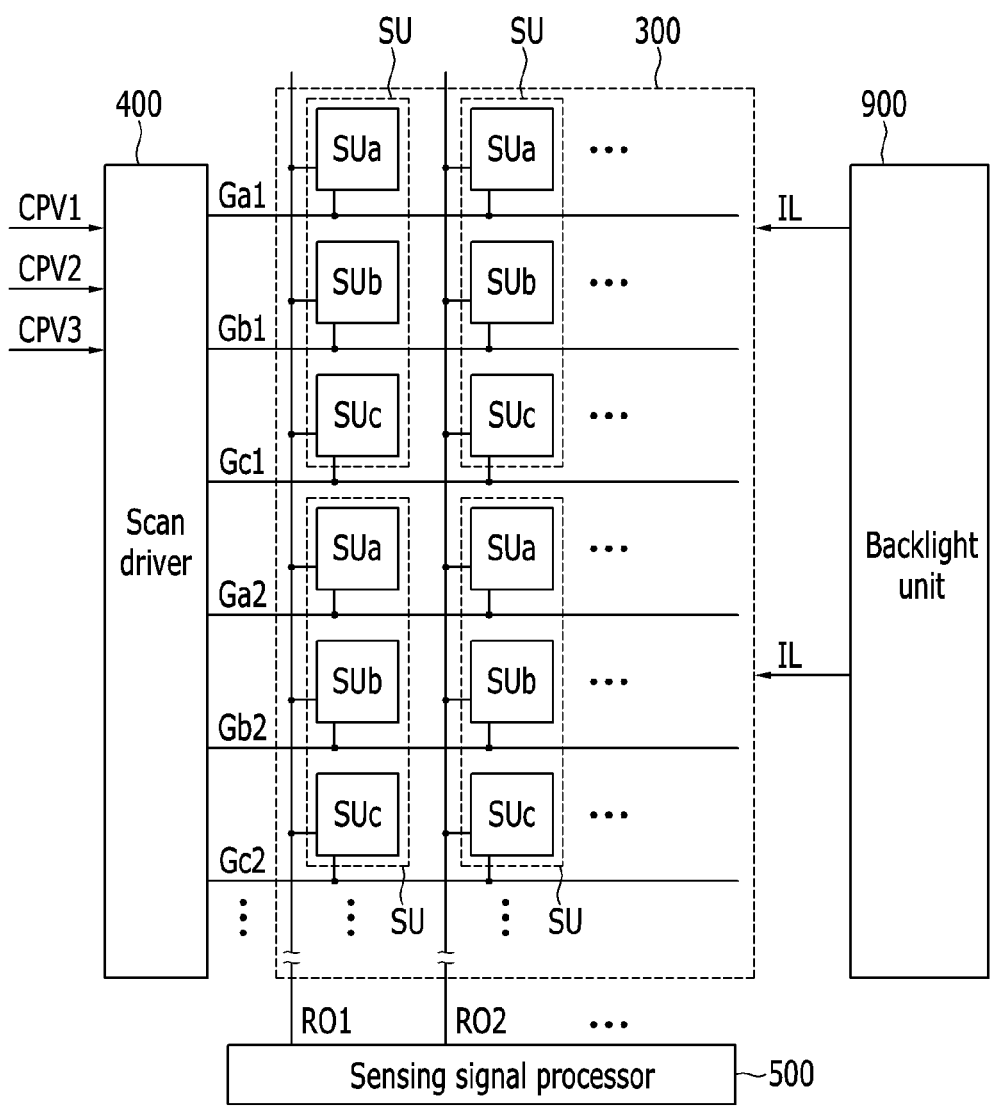
FIG. 1 is a layout view of a display device according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

Prior to explaining exemplary embodiments of the present invention, relevant terminology will be defined for the description below.

Hereinafter, exemplary embodiments of the present invention are described in detail with reference to the accompanying drawings.

A display device according to exemplary embodiments of the present invention will be described with reference to FIG. 1, FIG. 2, and FIG. 3.

FIG. 1 is a layout view of a display device. FIG. 2 is a circuit diagram of one sensing element included in a display device, and FIG. 3 is a schematic cross-sectional view of a display device.

Referring to FIG. 1, a display device having a light sensing function may include a sensing region 300, a scan driver 400, a sensing signal processor 500, and a backlight unit 900.

The sensing region 300 may correspond to a display area (not shown) where a plurality of pixels (not shown) of the display device are arranged.

The sensing region 300 may include a plurality of gate lines Ga1 . . . Gan, Gb1 . . . Gbn, and Gc1 . . . Gcn, (where n is a whole number greater than zero) a plurality of sensing signal lines RO1 . . . ROm (where m is a whole number greater than zero), and a plurality of sensing unit groups SU which are substantially arranged in a matrix form.

The plurality of gate lines (also referred to as "scanning signal lines") transmit scanning signals (or gate signals) and may extend in a substantially row direction. The plurality of gate lines Ga1 . . . Gan, Gb1 . . . Gbn, and Gc1 . . . Gcn may include a plurality of gate line groups. In particular, the plurality of gate lines Ga1 . . . Gan, Gb1 . . . Gbn, and Gc1 . . . Gcn may include a first gate line group (Ga1 . . . Gan), a second gate line group (Gb1 . . . Gbn), and a third gate line group (Gc1 . . . Gcn). The gate lines of the first gate line group (Ga1 . . . Gan), the second gate line group (Gb1 . . . Gbn), and the third gate line group (Gc1 . . . Gcn) may be arranged in an alternate manner.

Each of the first gate line group (Ga1 . . . Gan), the second gate line group (Gb1 . . . Gbn), and the third gate line group (Gc1 . . . Gcn) may independently transmit gate signals generated from the scan driver 400 according to a control of separate gate clock signals CPV1, CPV2, and CPV3. The gate clock signals CPV1, CPV2, and CPV3 control an output timing of a gate-on pulse. Accordingly, the first gate line group (Ga1 . . . Gan), the second gate line group (Gb1 . . . Gbn), and the third gate line group (Gc1 . . . Gcn) may independently transmit gate-on voltages at different timings or at the same time. The plurality of gate lines included in one gate line group may sequentially output the gate-on voltages according to a predetermined time unit. In this case, the predetermined time unit may be a 1 horizontal period 1H.

The plurality of sensing signal lines ("sensing data lines") RO1 . . . ROm (where m is any whole number greater than 0) may substantially extend in a column direction to cross the plurality of gate lines Ga1 . . . Gan, Gb1 . . . Gbn, Gc1 . . . Gcn. The sensing signal lines RO1 . . . ROm may receive contact reference voltage and transmit sensing signals provided by each of a plurality of sensing units SUa, SUb, and SUc included in the sensing unit group SU.

Each sensing unit group SU may include at least two sensing units. The sensing units SUa, SUb, and SUc included in one sensing unit group SU may be arranged in a column and/or row direction as shown in FIG. 1. The plurality of sensing units SUa, SUb, and SUc in the entire sensing region 300 may be arranged in a matrix form. It should be noted that the plurality of sensing units is not limited to SUa, SUb, and SUc, and that there may be various number of sensing units. In some cases, there may be as many sensing units in a sensing unit group as the number of the gate line groups.

The plurality of sensing units SUa, SUb, and SUc may include a first sensing unit SUa connected with the first gate line group (Ga1 . . . Gan), a second sensing unit SUb connected with the second gate line group (Gb1 . . . Gbn), and a third sensing unit SUc connected with the third gate line group (Gc1 . . . Gcn). The gate lines Ga1 . . . Gan, Gb1 . . . Gbn, Gc1 . . . Gcn may be disposed one by one in every sensing unit row.

The sensing signal lines RO1 . . . ROm may be disposed one by one according to every sensing unit column. The plurality of sensing units SUa, SUb, and SUc included in one sensing unit group SU may be connected with one sensing signal line (e.g., RO1 or RO2). In some cases, (not shown in FIG. 1), at least two of the plurality of sensing units SUa, SUb, and SUc included in one sensing unit group SU may be connected to different sensing signal lines.

The sensing units SUa, SUb, and SUc may sense a touch on the display device by using internal light IL generated from the backlight unit 900 or may sense an image of an external object to generate a sensing signal. For example, the sensing units SUa, SUb, and SUc may sense a touch of the external object by using infrared light or sense an image of the external object by using visible light.

Figure 2:
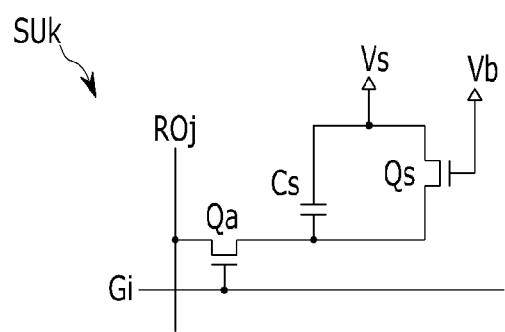
FIG. 2 is a circuit diagram of one sensing element included in a display device according to exemplary embodiments of the present invention.

Referring to FIG. 2, a sensing unit SUk may be one of the sensing units SUa, SUb, and SUc described above. The sensing unit SUk may include a switching element Qa connected with a gate line Gn and a sensing signal line ROm, a sensing element Qs connected with the switching element Qa, and a capacitor Cs.

The switching element Qa may be a three-terminal element such as a thin film transistor, in which a control terminal is connected with the gate line Gn, an output terminal is connected with the sensing signal line ROm, and an input terminal is connected with the sensing element Qs and the capacitor Cs. The gate line Gn may be any one of the first gate line group (Ga1 . . . Gan), the second gate line group (Gb1 . . . Gbn), and the third gate line group (Gc1 . . . Gcn) described above or a sub gate line connected thereto. The switching element Qa may transmit a sensing signal to the sensing signal line ROm according to the gate signal of the gate line Gn.

The sensing element Qs may be a three-terminal element such as a thin film transistor, in which an input terminal may receive a source voltage Vs ("a first voltage"), a control terminal may receive a bias voltage Vb ("a second voltage"), and an output terminal may be connected to the switching element Qa and Capacitor Cs. The bias voltage Vb may be low or high voltage, and may play the function of a gate-off voltage so that the sensing element Qs is in an off state when light is not detected/sensed by to the sensing element Qs. The sensing element Qs may sense a light to form light leakage current. The sensed light may include an external light, other than the internal light IL from the backlight unit 900, and when the light is the infrared light, a process of removing an influence by an external infrared light may be required.

Two terminals of the capacitor Cs may be connected to the switching element Qa and the source voltage Vs. The capacitor Cs may be charged as the reference voltage applied to the sensing signal line ROm, according to the gate signal of the gate line Gn, or discharged according to the light current of the sensing element Qs.

Figure 3:
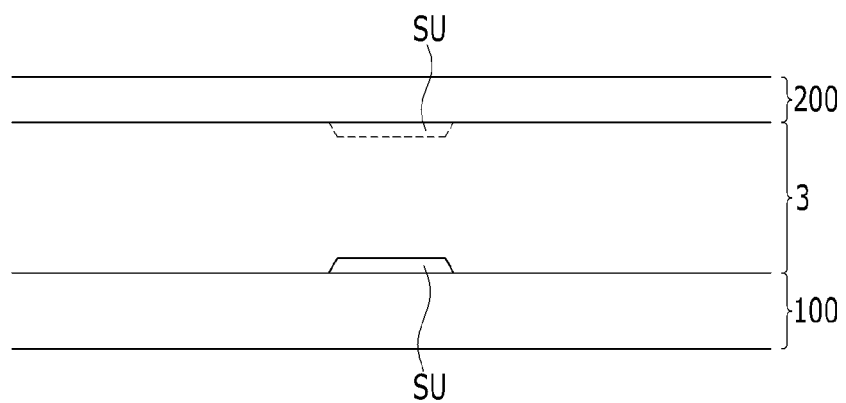
FIG. 3 is a schematic cross-sectional view of a display device according to exemplary embodiments of the present invention.

Referring to FIG. 3, the display device may include two display panels 100 and 200 which face each other and an intermediate layer 3 disposed between the two display panels 100 and 200. The sensing units SUa, SUb, and SUc may be disposed on the lower display panel 100 or the upper display panel 200. The intermediate layer 3 may include a liquid crystal layer, in the case of a liquid crystal display, an electrophoretic layer including charged particles in the case of an electrophoretic display, and a fluid in the case of an electrowetting display. If a display device includes one display panel 100 (e.g., organic light emitting device), the sensing units SUa, SUb, and SUc may be disposed on the display panel 100.

The display device may include a plurality of sensing units SUa, SUb, and SUc which may sense one kind of wavelength of light, or, in some cases, may sense radiations having different wavelengths. For example, a display device may include an infrared light sensing unit for sensing infrared light and a visible light sensing unit for sensing visible light. The infrared light sensing unit and the visible light sensing unit may be alternately arranged.

The scan driver 400 may be connected to the gate lines Ga1 . . . Gan, Gb1 . . . Gbn, and Gc1 . . . Gcn. The scan driver 400 may apply the gate signal, to the gate lines Ga1, Gb1, Gc1, Ga2, Gb2 and Gc2 by turning on and off the switching element Qa of one or more of the sensing units SUa, SUb, and SUc, using a gate-on or gate-off voltage. The scan driver 400 may receive at least three kinds of gate clock signals CPV1, CPV2, and CPV3, which may control output timings of gate-on pulses of the first gate line group (Ga1 . . . Gan), the second gate line group (Gb1 . . . Gbn), and the third gate line group (Gc1 . . . Gcn), respectively.

The sensing signal processor 500 may be connected with the sensing signal lines RO1 . . . RO2. The sensing signal processor 500 may receive the sensing signals from the sensing signal lines RO1 . . . RO2 to process the received sensing signals and perform analog-digital conversion for the processed sensing signals to generate digital sensing signals. The sensing signal processor 500 or another processor (not shown) may generate contact information, such as touch or non-touch information extracted from the digital sensing signal, a touch position, a shape and a size of a touched object.

The backlight unit 900 may generate the internal light IL such as infrared light, and visible light. In general, the backlight unit 900 may output radiation of any desired frequency. The backlight unit 900 may be disposed, for example, below the lower display panel 100 of the display device shown in FIG. 3, to radiate the generated internal light IL to the plurality of sensing units SUa, SUb, and SUc. The generated internal light IL may pass through the display device.

The backlight unit 900 generating the infrared light may be used to sense the touch of the external object. For instance, when the external object is close to the display device, the infrared light from the backlight unit 900 may be reflected from the external object to the sensing units SUa, SUb, and SUc. In some cases, the backlight unit 900 generating the visible light may also be used to sense the image of the external object. In such cases, when the external object is close to the display device, the visible light from the backlight unit 900 may be reflected from the external object to the sensing units SUa, SUb, and SUc.

Hereinafter, a sensing operation of the display device will be described with reference to FIG. 1 and FIG. 2.

The scan driver 400 may sequentially apply gate-on voltages Von to all gate lines included in any one group of the a plurality of the first gate line groups (Ga1 . . . Gan), a plurality of the second gate line groups (Gb1 . . . Gbn), and a plurality of the third gate line groups (Gc1 . . . Gcn) to turn on the switching element Qa of a sensing unit SUa, SUb or SUc. As a result, the reference voltage applied to the sensing signal line ROm may be transmitted to one terminal of the capacitor Cs and the capacitor Cs may be charged as much as a difference between the reference voltage and the source voltage Vs. This is called a reset step of the sensing unit SUa, Sub, SUc.

When the switching element Qa is turned off and the light is radiated to the sensing element Qs due to a touch of an external object, light leakage current may be generated in the sensing element Qs. As a result, voltage drop may occur in the terminal to which the reference voltage of the capacitor Cs was applied, such that the capacitor Cs is discharged. When the touch of the external object is not detected and light is not radiated to the sensing element Qs, the capacitor Cs may not be discharged. This is called a sensing step of the sensing unit SUa, SUb, or SUc.

In the reset step, when gate-on voltages Von are applied to all gate lines included in any one group of the plurality of the first gate line groups (Ga1 . . . Gan), the plurality of the second gate line groups (Gb1 . . . Gbn), and the plurality of the third gate line groups (Gc1 . . . Gcn), the switching element Qa may be turned on. In the sensing step, when the charged voltage of the capacitor Cs is changed by the detected touch, the reference voltage is recharged in the capacitor Cs through the turned-on switching element Qa. Current may be generated in the sensing signal line ROm to provide the sensing signal. The sensing signal may be sent to the sensing signal processor 500 to be processed. In the sensing step, when a touch is not detected, the sensing signal may not be generated. However, in some cases, the sensing signal may be generated according to various other conditions, such as detecting an external light when a touch is not detected, and even in some cases when a touch is detected, a difference in the sensing signal may occur according to certain conditions, such as the amount of an external light detected. Accordingly, a method for preventing an error of the contact information may be required. This will be described with reference to exemplary embodiments to be described below.

A display device will be described with reference to FIG. 4, FIG. 5, FIG. 6, FIG. 7, FIG. 8, and FIG. 9. The same elements in FIG. 4, FIG. 5, FIG. 6, FIG. 7, FIG. 8, and FIG. 9 are given the same reference numerals as described hereinabove, and the description thereof is omitted to avoid repetition.

FIG. 4, FIG. 5, FIG. 6, FIG. 7, FIG. 8, and FIG. 9 are layout views of a display device.

Figure 4:
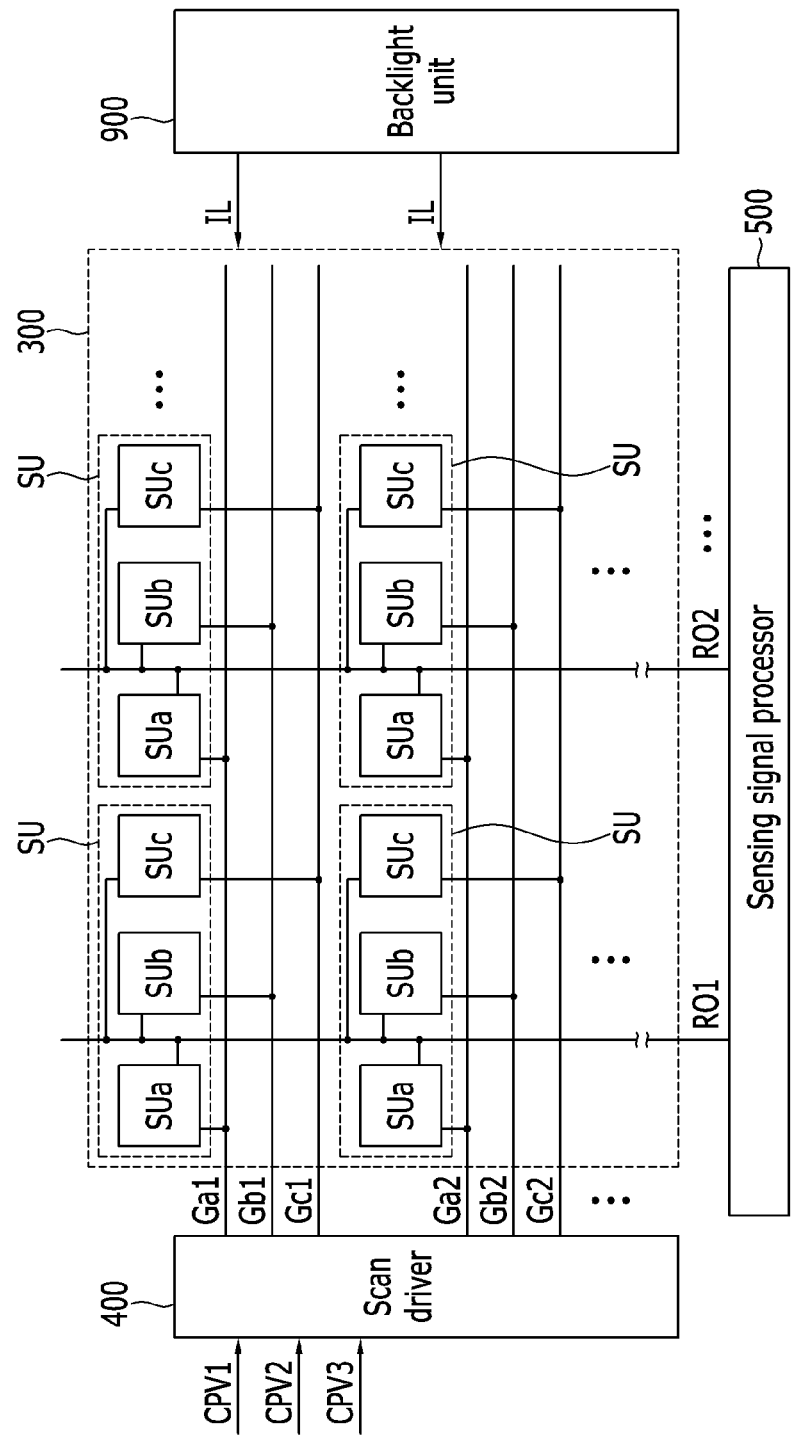
FIG. 4, FIG. 5, FIG. 6, FIG. 7, FIG. 8, and FIG. 9 are layout views of a display device according to exemplary embodiments of the present invention.

Referring to FIG. 4, the display device is similar to device as shown in FIG. 1, FIG. 2 and FIG. 3, but an arrangement of the sensing unit group SU is different.

The sensing units SUa, SUb, and SUc included in one sensing unit group SU may be arranged in series in a row direction. Accordingly, the gate line of the first gate line group (Ga1 ... Gan), the gate line of the second gate line group (Gb1 ... Gbn), and the gate line of the third gate line group (Gc1 ... Gcn) may be arranged one by one in every sensing unit row. Accordingly, in some cases, three gate lines may be arranged per one sensing unit row.

One sensing signal line RO1 or RO2 may be disposed for each sensing unit group SU column. For example, the sensing units SUa, SUb, and SUc, included in each sensing unit group SU, may be connected to the same sensing signal lines RO1 ... ROm. Further, the sensing signal lines RO1 ... ROm may extend between the sensing units SUa, SUb, and SUc of each sensing unit group SU as shown in FIG. 4. However, exemplary embodiments of the inventions are not limited thereto, and sensing signal lines RO1 ... Rom may extend in a column direction on the left or right of the sensing unit group SU.

In some cases (not shown), a plurality of sensing signal lines may be disposed for each sensing unit group SU column and at least two of the sensing units SUa, SUb, and SUc, in one sensing unit group SU, may be connected to the different sensing signal lines.

Figure 5:
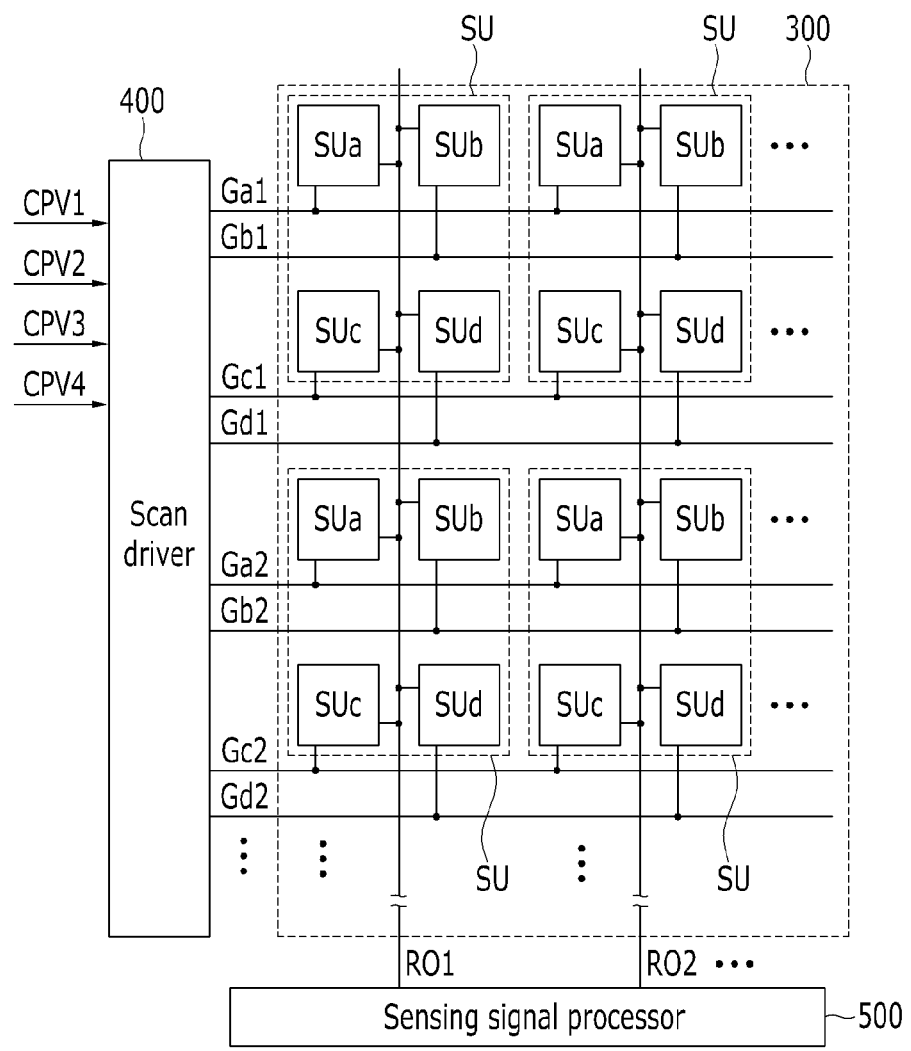

Referring to FIG. 5, the display device is similar to device as shown in FIG. 1, FIG. 2 and FIG. 3, but a number of the sensing units included in one sensing unit group SU and a number of the gate lines may be different.

The display device may include a first gate line group (Ga1 ... Gan), a second gate line group (Gb1 ... Gbn), a third gate line group (Gc1 ... Gcn), and a fourth gate line group (Gd1, Gd2). The gate lines of the first gate line group (Ga1 ... Gan), the second gate line group (Gb1 ... Gbn), the third gate line group (Gc1 ... Gcn), and the fourth gate line group (Gd1, Gd2) may be alternately arranged. Each of the first gate line group (Ga1 ... Gan), the second gate line group (Gb1 ... Gbn), the third gate line group (Gc1 ... Gcn), and the fourth gate line group (Gd1, Gd2) may independently transmit the gate signals according to a control of separate gate clock signals CPV1, CPV2, CPV3, and CPV4.

One sensing unit group SU may include four sensing units SUa, SUb, SUc, and SUd. The sensing units SUa, SUb, SUc, and SUd included in one sensing unit group SU may be arranged in series in a row or column direction as shown in FIG. 1 or FIG. 4, and, in some cases, may be arranged in a quadrangular shape as shown in FIG. 5. Positions of the four sensing units SUa, SUb, SUc, and SUd in one sensing unit group SU may be changed.

A plurality of sensing units SUa, SUb, SUc, and SUd may include a first sensing unit SUa connected with the first gate line group (Ga1 ... Gan), a second sensing unit SUb connected with the second gate line group (Gb1 ... Gbn), a third sensing unit SUc connected with the third gate line group (Gc1 ... Gcn), and a fourth sensing unit SUd connected with the fourth gate line group (Gd1, Gd2). The gate lines Ga1 ... Gan, Gb1 ... Gbn, Gc1 ... Gcn, Gd1, Gd2 may be disposed every one sensing unit row in a two by two manner, as shown in FIG. 5. One gate line of the first gate line group (Ga1 ... Gan) and one gate line of the second gate line group (Gb1 ... Gbn, ... ) may be disposed at the sensing unit row where the two sensing units SUa and Sub are disposed and one gate line of the third gate line group (Gc1 ... Gcn) and one gate line of the fourth gate line group (Gd1, Gd2) may be disposed at the sensing unit row where the two sensing units SUc and SUd may be disposed.

One sensing signal line RO1 ... ROm may be disposed for each sensing unit column. For example, the plurality of sensing units SUa, SUb, SUc, and SUd included in one sensing unit group SU, may be connected to the same sensing signal line. Further, the sensing signal lines RO1, RO2 may extend to pass between the sensing units SUa, SUb, SUc, and SUd of each sensing unit group SU connected with the sensing signal line, as shown in FIG. 5, but may not be limited thereto, and may extend in a column direction at the left or right of the sensing unit group SU.

In some cases, (not shown in FIG. 5), a plurality of sensing signal lines may be disposed for each sensing unit group SU column and at least two of the sensing units SUa, SUb, SUc, and SUd, included in one sensing unit group SU, may be connected to different sensing signal lines.

FIG. 5 also includes the backlight unit 900 described above, but for convenience, the backlight unit 900 is not shown in FIG. 5 and in the subsequent drawings.

Figure 6:
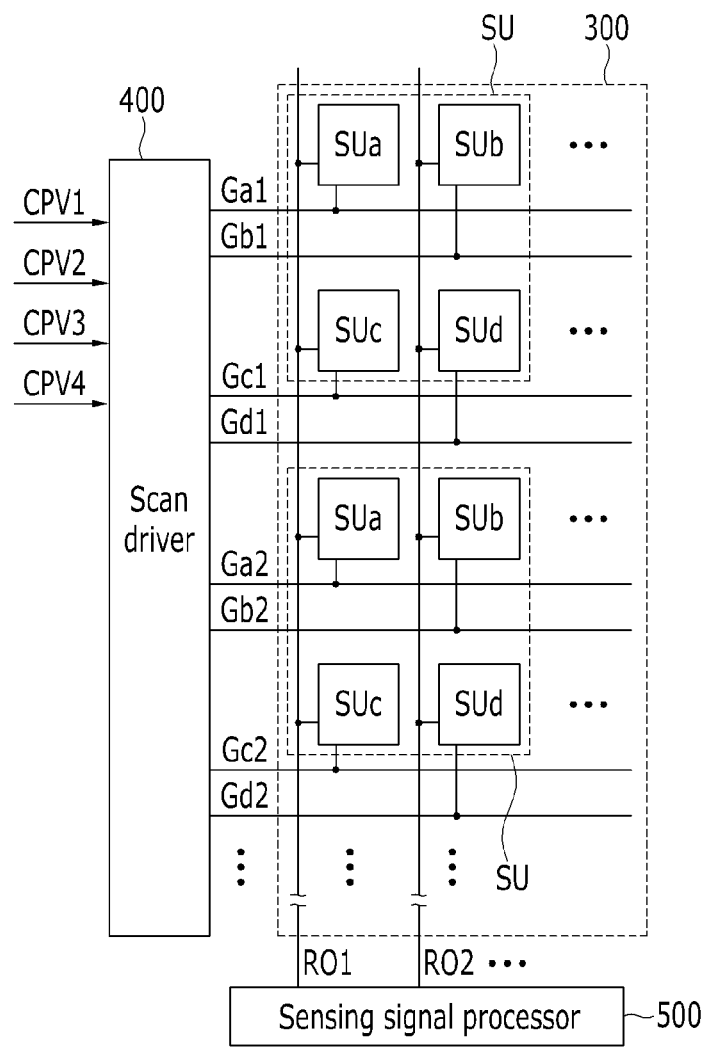

Referring to FIG. 6, the display device in FIG. 6 is similar to the device shown in FIG. 5, however, two sensing signal lines are disposed for each sensing unit group SU column. Two sensing units SUa and SUc of the sensing units SUa, SUb, SUc, and SUd, included in one sensing unit group SU, may be connected with the first sensing signal line RO1 and the remaining two sensing units SUb and SUd may be connected with the second sensing signal line RO2. It should be understood that the connection of sensing units SUa, SUb, SUc, and SUd to the sensing signal lines RO1 and RO2 may vary, and several different arrangements and configurations are possible. For instance, the position of sensing unit SUb and sensing unit SUc may be switched, and the position of gate lines Gb1 and Gc1 may be switched. Accordingly, in such instances, sensing units SUa and SUb, included in one sensing unit group SU, may be connected with the first sensing signal line RO1 and the remaining two sensing units SUc and SUd may be connected with the second sensing signal lines RO2.

Figure 7:
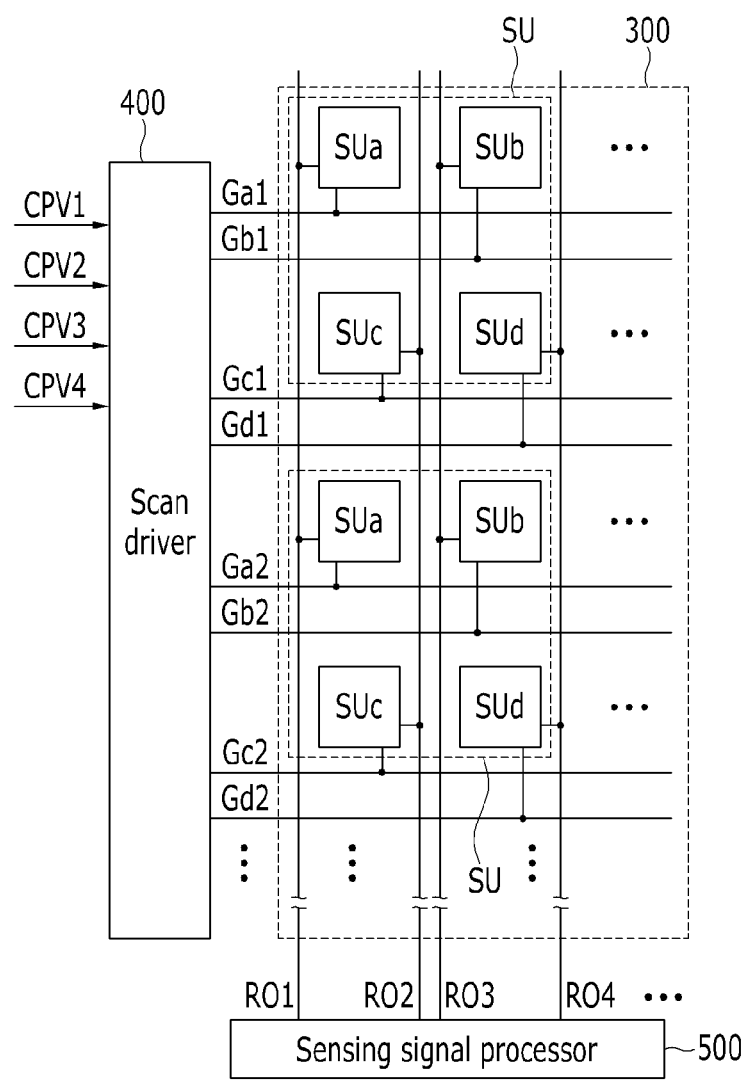

Referring to FIG. 7, the display device in FIG. 7 is similar to the device shown in FIG. 5, however, four sensing signal lines may be disposed for each sensing unit group SU column. The sensing units SUa, SUb, SUc, and SUd, included in one sensing unit group SU, may be connected with different sensing signal lines RO1, RO2, RO3, and RO4, respectively. For example, two of the sensing signal lines RO1, RO2, RO3, and RO4 may be disposed at two sides of each of the sensing unit columns, and two of the sensing signal lines RO1, RO2, RO3 and RO4 may be disposed between two sensing unit columns. Accordingly, two sensing signal lines may pass between the adjacent sensing units SUa, SUb, SUc, and SUd in a row direction.

Figure 8:
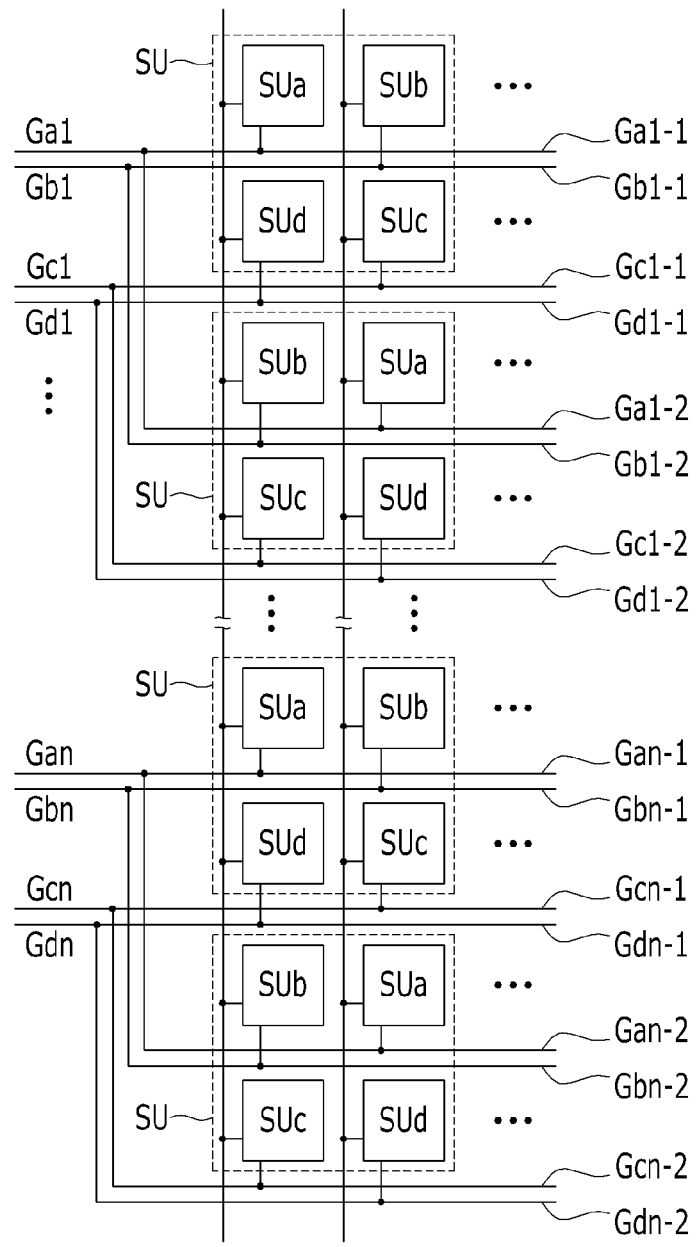

Referring to FIG. 8, the display device in FIG. 8 is similar to the device shown in FIG. 6, but the sensing units SUa, SUb, SUc, and SUd and the gate lines may be differently disposed in each sensing unit group SU.

The gate lines Ga1 ... Gan, Gb1 ... Gbn, Gc1 ... Gcn, Gd1 ... Gdn may include a pair of sub-gate lines to maintain a predetermined interval in a column direction. The gate lines Ga1 ... Gan, Gb1 ... Gbn, Gc1 ... Gcn, and Gd1 ... Gdn of the first, second, third, and fourth gate line groups may include first sub-gate lines Ga1-1 ... Gan-1, Gb1-1 ... Gbn-1, Gc1-1 ... Gcn-1, and Gd1-1 ... Gdn-1, respectively, and second sub-gate lines Ga1-2 ... Gan-2, Gb1-2 ... Gbn-2, Gc1-2 ... Gcn-2, and Gd1-2 ... Gdn-2, respectively. Two sensing unit rows may substantially be disposed between two sub-gate lines included in one gate line. Further, a pair of two sub-gate lines (Ga1-1, Gb1-1) (Gc1-1, Gd1-1) (Ga1-2, Gb1-2) (Gc1-2, Gd1-2) (Gan-1, Gbn-1) (Gcn-1, Gdn-1) (Gan-2, Gbn-2) (Gcn-2, Gdn-2) may be disposed between two sensing unit rows.

The first sensing unit SUa may be connected to the first sub-gate lines Ga1-1 ... Gan-1 or the second sub-gate lines Ga1-2 ... Gan-2 of the gate line of the first gate line group (Ga1 ... Gan); the second sensing unit SUb may be connected to the first sub-gate lines Gb1-1 ... Gbn-1 or the second sub-gate lines Gb1-2 ... Gbn-2 of the gate line of the second gate line group (Gb1 ... Gbn); the third sensing unit SUc may be connected to the first sub-gate lines Gc1-1 ... Gcn-1 or the second sub-gate lines Gc1-2 ... Gcn-2 of the gate line of the third gate line group (Gc1 ... Gcn); and the fourth sensing unit SUd may be connected to the first sub-gate lines Gd1-1 ... Gdn-1 or the second sub-gate lines Gd1-2 ... Gdn-2 of the gate line of the fourth gate line group (Gd1 ... Gdn).

The sensing units SUa, SUb, SUc, and SUd, which may be connected to the first sub-gate lines Ga1-1, Gb1-1, Gc1-1, Gd1-1, ... Gan-1, Gbn-1, Gcn-1, and Gdn-1 and the second sub-gate lines Ga1-2, Gb1-2, Gc1-2, Gd1-2, ... Gan-2, Gbn-2, Gcn-2, and Gdn-2, which may be connected to each other in one gate line Ga1, Gb1, Gc1, Gd1, ... Gan, Gbn, Gcn, and Gdn, respectively, may be connected to different sensing signal lines RO1 ... ROm. Accordingly, when gate-on voltages may be simultaneously applied to the first sub-gate lines Ga1-1, Gb1-1, Gc1-1, Gd1-1, ... Gan-1, Gbn-1, Gcn-1, and Gdn-1 and the second sub-gate lines Ga1-2, Gb1-2, Gc1-2, Gd1-2, ... Gan-2, Gbn-2, Gcn-2, and Gdn-2 that form one gate line, the sensing signals provided by the sensing units SUa, SUb, SUc, and Sud that may be connected to the first and second sub-gate lines and disposed at different positions may be differentiated.

As described above, the sensing units SUa, SUb, SUc, and Sud, which are included in two sensing unit groups SUs adjacent to each other in a column direction, may be arranged such that the two sensing units, which may be respectively connected to the first sub-gate lines Ga1-1, Gb1-1, Gc1-1, Gd1-1, Gan-1, Gbn-1, Gcn-1, and Gdn-1 and the second sub-gate lines Ga1-2, Gb1-2, Gc1-2, Gd1-2, Gan-2, Gbn-2, Gcn-2, and Gdn-2 included in one gate line, are connected to different sensing signal lines RO1, RO2. For example, as shown in FIG. 8, the sensing units SUa, SUb, SUc, and Sud, may have mirror symmetry in a column direction. The first sensing unit SUa, the second sensing unit SUb, the third sensing unit SUc, and the fourth sensing unit SUd of a sensing unit group SU may be sequentially arranged in a clockwise direction, and the first sensing unit SUa, the second sensing unit SUb, the third sensing unit SUc, and the fourth sensing unit SUd of a second sensing unit group SU adjacent to the first sensing unit group SU in a column direction may be arranged in a counterclockwise direction in the order.

Figure 9:
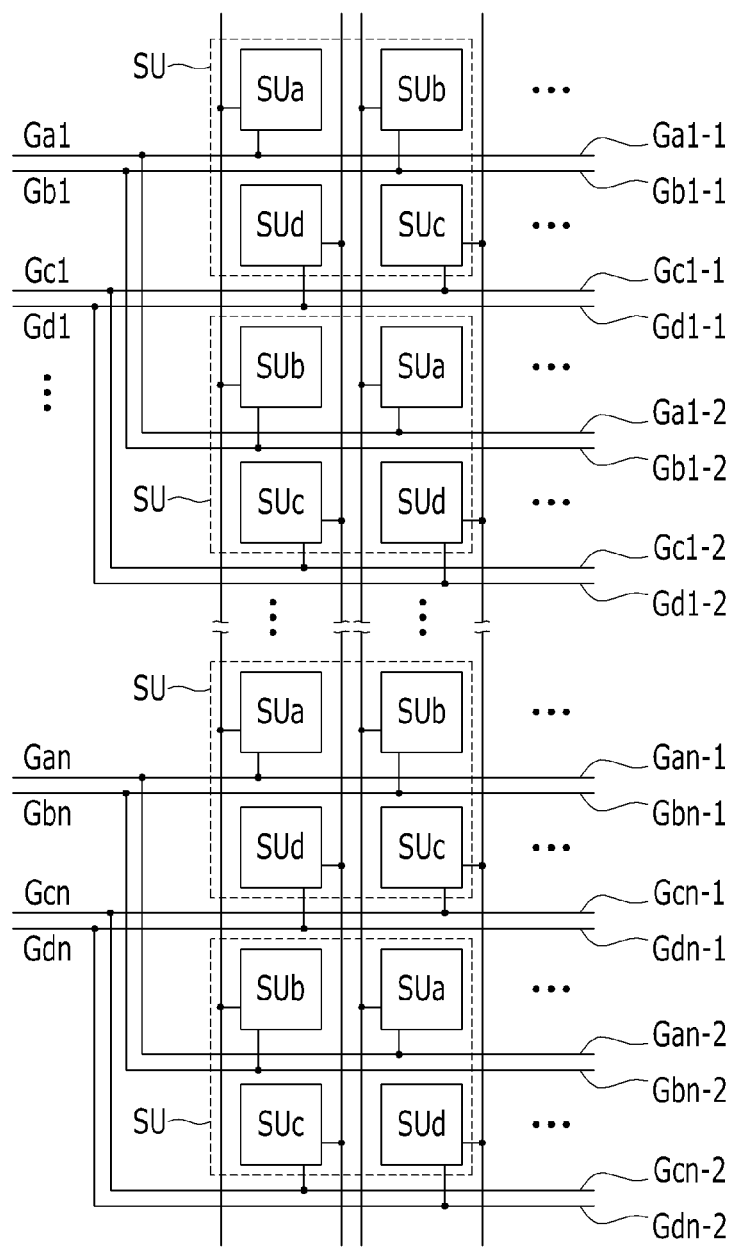
Figure 10:
FIG. 10, FIG. 11, FIG. 12, and FIG. 13 are diagrams illustrating a method of processing data of sensing signals provided by a plurality of sensing elements included in a display device according to exemplary embodiments of the present invention.
Figure 11:
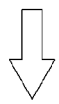
Figure 12:
Figure 13:

Referring to FIG. 9, the display device in FIG. 9 is similar to the device shown in FIG. 8, but the sensing signal lines, disposed for every sensing unit column, may be different.

Two sensing signal lines RO1, RO2, RO3, and RO4 may be disposed every sensing unit SUa, SUb, SUc, or SUd column and four sensing signal lines RO1, RO2, RO3, and RO4 may be disposed every sensing unit group SU. Accordingly, four sensing units SUa, SUb, SUc, and SUd, included in each sensing unit group SU, may be connected to different gate lines Ga1, Gb1, Gc1, Gd1, ... Gan, Gbn, Gcn, and Gdn and connected to different sensing signal lines RO1, RO2, RO3, RO4. As shown in FIG. 9, the arrangements of the sensing units SUa, SUb, SUc, and SUd, which are included in two sensing unit groups SU adjacent to each other in a column direction, may be different or the same.

When the arrangements of the sensing units SUa, SUb, SUc, and Sud, which are included in two sensing unit groups SU adjacent to each other in a column direction are the same as each other, two sensing units SUa, SUb, SUc, and SUd, which are connected to the first sub-gate lines Ga1-1, Gb1-1, Gc1-1, Gd1-1, ... Gan-1, Gbn-1, Gcn-1, and Gdn-1 and the second sub-gate lines Ga1-2, Gb1-2, Gc1-2, Gd1-2, ... Gan-2, Gbn-2, Gcn-2, and Gdn-2 of the same gate line, respectively, may be disposed at the same sensing unit column and may be connected to the different sensing signal lines RO1, RO2, RO3, RO4, for example, the sensing signal lines RO1, RO2, RO3, RO4 disposed at both sides with respect to the sensing units SUa, SUb, SUc, and SUd.

When the arrangements of the sensing units SUa, SUb, SUc, and SUd, which are included in two sensing unit groups SU adjacent to each other in a column direction, are different, one kind of sensing units SUa, SUb, SUc, and SUd may be arranged to form a zigzag shape in a column direction or row direction and may acquire contact information at an even position. Accordingly, accuracy of the contact information may further increase. One kind of sensing unit may mean any one sensing unit of the first sensing unit SUa, the second sensing unit SUb, the third sensing unit SUc, and the fourth sensing unit SUd.

A method of data-processing a sensing signal transmitted by the sensing units SUa, SUb, SUc, and SUd of the display device shown in FIG. 8 or FIG. 9 will be described with reference to FIG. 10, FIG. 11, FIG. 12, and FIG. 13.

FIG. 10, FIG. 11, FIG. 12, and FIG. 13 are diagrams illustrating a method of processing data of sensing signals output from a plurality of sensing elements included in a display device.

First, in the plurality of sensing unit groups SUs arranged in one column direction, the first to last rows of the data provided by the first sensing unit SUa may sequentially be represented by Da1, Da2, Da3, Da4 ... Dan, the first to last rows of the data provided by the second sensing unit SUb may sequentially be represented by Db1, Db2, Db3, Db4 ... Dbn the first to last rows of the data provided by the third sensing unit SUc may sequentially be represented by Dc1, Dc2, Dc3, Dc4 ... Dcn and the first to last rows of the data provided by the fourth sensing unit SUd may sequentially be represented by Dd1, Dd2, Dd3, Dd4 ... Ddn. It should be appreciated that "n" may be any whole number greater than zero and may correspond to the number of gate lines.

Referring to FIG. 10, FIG. 11, FIG. 12, and FIG. 13, the leftmost two columns of a first table TB1 represent sensing signal data provided from two sensing signal lines RO1 and RO2, which may be alternately connected with the first sensing unit SUa, the second sensing unit Sub, the third sensing unit SUc, and the fourth sensing unit SUd disposed in one sensing unit group SU column shown in FIG. 8 or FIG. 9. Since the first sensing unit SUa, the second sensing unit SUb, the third sensing unit SUc, the fourth sensing unit SUd disposed in one sensing unit group SU column are alternately connected to two sensing signal lines RO1 and RO2, as shown in FIG. 10, FIG. 11, FIG. 12, and FIG. 13, the sensing signal data Da1, Da2, Da3, Da4 ... Dan, Db1, Db2, Db3, Db4 ...

Dbn, Dc1, Dc2, Dc3, Dc4 . . . Dcn, Dd1, Da2, Da3, Da4 . . . Dan of the corresponding sensing unit are arranged over two columns of the first table TB1. Since the rest of the sensing unit group SU columns, which are not shown in the exemplary embodiment shown in FIG. 8 or FIG. 9, may also be configured in a similar manner as the shown portion, the remaining columns other than first two columns in the first table TB1 shown FIG. 10, FIG. 11, FIG. 12, and FIG. 13 may also be repetitively configured to be the same as the first two columns.

The sensing signal data provided according to an arrangement order of the sensing signal lines RO1, RO2, RO3, RO4 . . . ROm in the row direction, as shown in the first table TB1, may be rearranged according to an arrangement order of the sensing units SUa, SUb, SUc, and SUd in the column direction, as shown in the second table TB2. The data of the sensing signals from the first sensing unit SUa, the second sensing unit SUb, the third sensing unit SUc, and the fourth sensing unit SUd of each sensing unit group SU column may be processed so as to correspond to the order in which the first sensing unit SUa, the second sensing unit SUb, the third sensing unit SUc, and the fourth sensing unit SUd may be arranged in the column direction, such that it may be possible to obtain exact contact information and reproduce exact images. The rearrangement of the sensing signal data may be performed in the sensing signal processor 500 as described above.

A display device will be described with reference to FIG. 14. The same constituent elements are given the same reference numerals and the same description is omitted.

Figure 14:
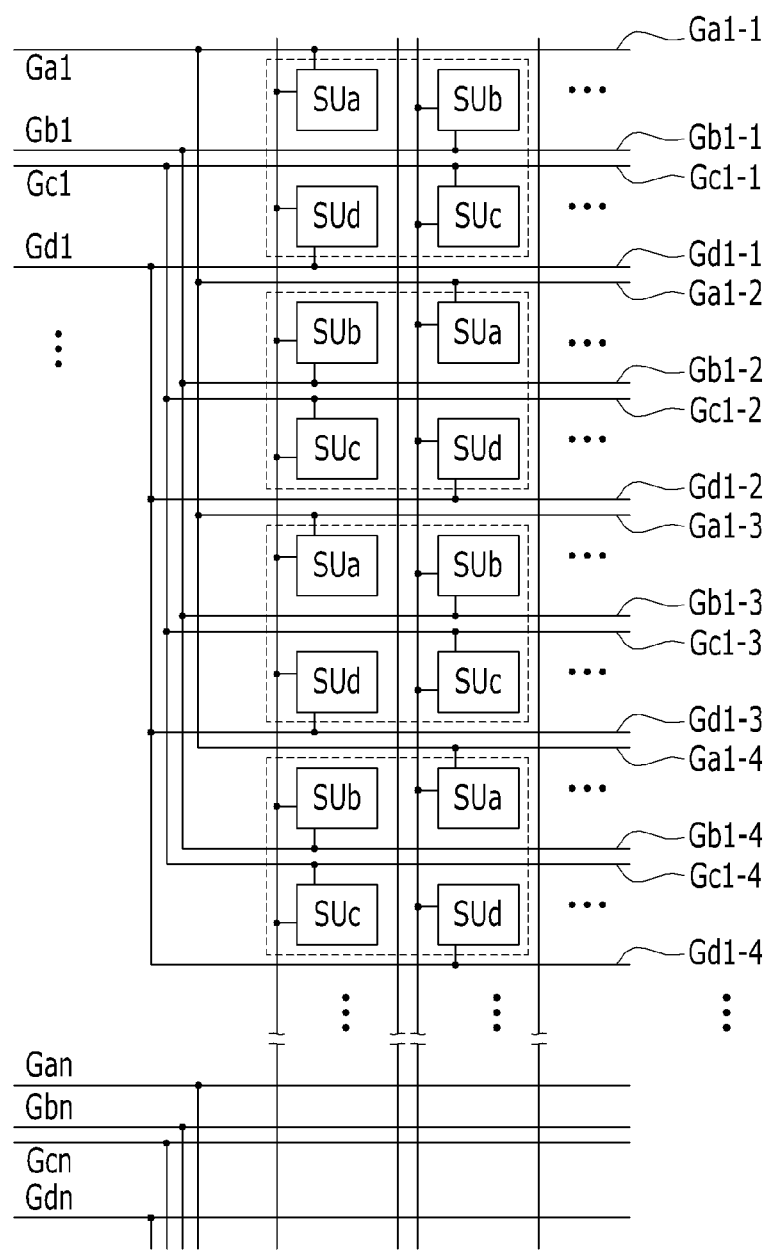
FIG. 14 is a layout view of a display device according to exemplary embodiments of the present invention.

FIG. 14 is a layout view of a display device.

Referring to FIG. 14, the display device in FIG. 14 is similar to the device shown in FIG. 9, except the number of the sub-gate lines included in one gate line of each gate line group may be different.

The gate lines Ga1 . . . Gan, Gb1 . . . Gbn, Gc1 . . . Gcn, and Gd1 . . . Gdn may be connected and may include three sub-gate lines to maintain a predetermined interval in a column direction. In detail, the gate lines Ga1 . . . Gan, Gb1 . . . Gbn, Gc1 . . . Gcn, and Gd1 . . . Gdn of the first, second, third, and fourth gate line groups may include the first sub-gate lines Ga1-1 . . . Gan-1, Gb1-1 . . . Gbn-1, Gc1-1 . . . Gcn-1, Gd1-1 . . . Gdn-1, the second sub-gate lines Ga1-2 . . . Gan-2, Gb1-2 . . . Gbn-2, Gc1-2 . . . Gcn-2, Gd1-2 . . . Gdn-2, the third sub-gate lines Ga1-3 . . . Gan-3, Gb1-3 . . . Gbn-3, Gc1-3 . . . Gcn-3, Gd1-3 . . . Gdn-3, and the fourth sub-gate lines Ga1-4 . . . Gan-4, Gb1-4 . . . Gbn-4, Gc1-4 . . . Gcn-4, and Gd1-4 . . . Gdn-4. The sub-gate lines included in the last gate lines Gan, Gbn, Gcn, and Gdn of each gate line group are not shown for convenience, but the gate lines including the first, second, third, and fourth sub-gate lines Gan-1, Gan-2, Gan-3, and Gan-4, Gbn-1, Gbn-2, Gbn-3, and Gbn-4, Gcn-1, Gcn-2, Gcn-3, and Gcn-4, Gdn-1, Gdn-2, Gdn-3, and Gdn-4 will be described.

Two sensing units SUa, SUb, SUc, and SUd rows may substantially be disposed between four sub-gate lines included in one gate line. For example, two sub-gate lines may be disposed for every sensing unit SUa, SUb, SUc, or SUd column.

Each of the first sensing unit SUa, the second sensing unit SUb, the third sensing unit SUc, and the fourth sensing unit SUd may be connected with any one of four sub-gate lines Ga1-1, Ga1-2, Ga1-3, Ga1-4 . . . , Gan-1, Gan-2, Gan-3, and Gan-4, Gb1-1, Gb1-2, Gb1-3, Gb1-4 . . . , Gbn-1, Gbn-2, Gbn-3, and Gbn-4, Gc1-1, Gc1-2, Gc1-3, Gc1-4 . . . , Gcn-1, Gcn-2, Gcn-3, and Gcn-4, Gd1-1, Gd1-2, Gd1-3, Gd1-4 . . . , Gdn-1, Gdn-2, Gdn-3, and Gdn-4 of the gate lines included in the first gate line group (Ga1 . . . Gan), the second gate line group (Gb1 . . . Gbn), the third gate line group (Gc1 . . . Gcn), the fourth gate line group (Gd1 . . . Gdn).

Further, one kind of sensing units SUa, SUb, SUc, and SUd connected to different sub-gate lines of one gate line Ga1, Gb1, Gc1, Gd1, . . . , Gan, Gbn, Gcn, or Gdn may be connected to different sensing signal lines RO1, RO2, RO3, RO4. Accordingly, when gate-on voltages are simultaneously applied to different sub-gate lines which form one gate line, the sensing signals provided from one kind of the sensing units SUa, SUb, SUc, and SUd, which are connected to the sub-gate lines and disposed at different positions, may be differentiated to generate contact information.

As described above, one kind of four sensing units SUa, SUb, SUc, and Sud, which may be included in two sensing unit groups SU adjacent to each other in a column direction, may be differently arranged such that the one kind of four sensing units SUa, SUb, SUc, and SUd, which are connected to different sub-gate lines included in one gate line, respectively, may be connected to the different sensing signal lines RO1, RO2, RO3, and RO4. For example, as shown in FIG. 14, the arrangement of the sensing units SUa, SUb, SUc, and Sud, may have mirror symmetry in a column direction. A first sensing unit SUa, a second sensing unit SUb, a third sensing unit SUc, and a fourth sensing unit SUd of a first sensing unit group SU may be sequentially arranged in a clockwise direction, and a first sensing unit SUa, a second sensing unit SUb, a third sensing unit SUc, and a fourth sensing unit SUd of a second sensing unit group SU adjacent to the first sensing unit group SU in a column direction, may be sequentially arranged in a counterclockwise direction.

Four gate lines Ga1, Gb1, Gc1, Gd1, . . . , Gan, Gbn, Gcn, Gdn, which are disposed at the same x-th (where x is a whole number greater than zero) of the gate line groups (Ga1, . . . , Gan) (Gb1, . . . , Gbn) (Gc1, . . . , Gcn) (Gd1, . . . , Gdn) and adjacent to each other, may include total 16 sub-gate lines and may be connected with four sensing unit groups (i.e., 16 sensing units SUa, SUb, SUc, and SUd). The four sensing unit groups adjacent to each other in a column direction may be repetitively disposed in a row direction or column direction in the sensing region 300.

Various features of the exemplary embodiments described above may also be applied to the exemplary embodiment shown in FIG. 14.

A method of processing data of the sensing signal transmitted by the sensing units SUa, SUb, SUc, and SUd of the display device shown in FIG. 14 will be described with reference to FIG. 15, FIG. 16, FIG. 17, and FIG. 18.

FIG. 15, FIG. 16, FIG. 17, and FIG. 18 are diagrams illustrating a method of processing sensing signals provided from a plurality of sensing elements included in a display device.

The method of processing the sensing signal similar to FIG. 10, FIG. 11, FIG. 12, and FIG. 13 is omitted to avoid repetition.

Referring to FIG. 15, FIG. 16, FIG. 17, and FIG. 18, the leftmost four columns of a first table TB1 may represent sensing signal data provided from four sensing signal lines RO1, RO2, RO3, and RO4, which may be connected to the first sensing unit SUa, the second sensing unit SUb, the third sensing unit SUc, and the fourth sensing unit SUd disposed at one sensing unit group SU column as shown in FIG. 14. Since the first sensing unit SUa, the second sensing unit SUb, the third sensing unit SUc, and the fourth sensing unit SUd disposed at one sensing unit group SU column may be connected to four adjacent sensing signal lines RO1, RO2, RO3, and RO4, respectively, as shown in FIG. 15, FIG. 16, FIG. 17, and FIG. 18, the sensing signal data Da1, Da2, Da3, Da4, Db1, Db2, Db3, Db4, Dc1, Dc2, Dc3, Dc4, and Dd1, Da2, Da3, Dd4, of the corresponding sensing unit may be arranged over four columns of the first table TB1. The remaining sensing unit group columns are not shown in FIG. 14, but may be configured to be the same as the shown portion. The columns other than first four columns in the first table TB1 shown in FIG. 15, FIG. 16, FIG. 17, and FIG. 18 may also be repetitively configured to be the same as the first four columns.

As shown in FIG. 14, the order of the sensing signal lines RO1, RO2, RO3, and RO4 connected with the first sensing unit SUa, the second sensing unit SUb, the third sensing unit SUc, and the fourth sensing unit SUd, which may be connected to the same gate lines Ga1 . . . Gan, Gb1 . . . Gbn, Gc1 . . . Gcn, and Gd1 . . . Gdn and sequentially disposed along a column direction in one sensing unit group SU column, may not coincide with the order of the sensing signal lines RO1, RO2, RO3, and RO4.

For example, referring to FIG. 15, the first sensing unit SUa connected with four sub-gate lines Ga1-1, Ga1-2, Ga1-3, and Ga1-4 of one gate line of the first gate line group (Ga1 . . . Gan) in sequence may be connected to the first sensing signal line RO1, the third sensing signal line RO3, the second sensing signal line RO2, and the fourth sensing signal line RO4 in sequence. When the sensing signal data provided from the arrangement order of the sensing signal lines RO1, RO2, RO3, RO4 are sequentially arranged, the sensing signal data may be arranged as the first table TB1 of FIG. 15. For example, the sensing signal data from the first sensing unit SUa of the first sensing unit group SU, which may be connected with the sensing signal line RO1, is provided at the leftmost of the first table TB1. The sensing signal data for the fourth sensing unit SUd shown in FIG. 18 may also be the same as described above.

Referring to FIG. 16, the second sensing unit SUa connected to four sub-gate lines Ga1-1, Ga1-2, Ga1-3, and Ga1-4 of one gate line of the second gate line group (Gb1 . . . Gbn) in sequence may be connected to the third sensing signal line RO3, the first sensing signal line RO1, the fourth sensing signal line RO4, and the second sensing signal line RO2 in sequence. Accordingly, when the sensing signal data provided from the arrangement order of the sensing signal lines RO1, RO2, RO3, RO4 are sequentially arranged, the sensing signal data may be arranged as in the first table TB1 of FIG. 16. For example, the sensing signal data from the second sensing unit SUa of the second sensing unit group SU, which may be connected with the first sensing signal line RO1, is disposed at the leftmost of the first table TB1. The sensing signal data for the third sensing unit SUc shown in FIG. 17 may also be the same as described above.

Since the sensing signal data provided in the order of the first table TB1 may not coincide with the order of the sensing units SUa, SUb, SUc, and SUd, the sensing signal data may be processed to coincide with the arrangement order of the sensing units SUa, SUb, SUc, and SUd as shown in the second table TB2. As described above, the sensing signal data from the first sensing unit SUa, the second sensing unit SUb, the third sensing unit SUc, and the fourth sensing unit SUd of each sensing unit group SU column may be processed so that they may correspond to the arrangement order of the first sensing unit SUa, the second sensing unit SUb, the third sensing unit SUc, and the fourth sensing unit SUd in the column direction, such that exact contact information may be obtained and an exact image may be reproduced.

Various features of the exemplary embodiments shown in FIG. 10, FIG. 11, FIG. 12, and FIG. 13 described above may also be applied to the exemplary embodiments as shown in FIG. 15, FIG. 16, FIG. 17, and FIG. 18.

Figure 19:
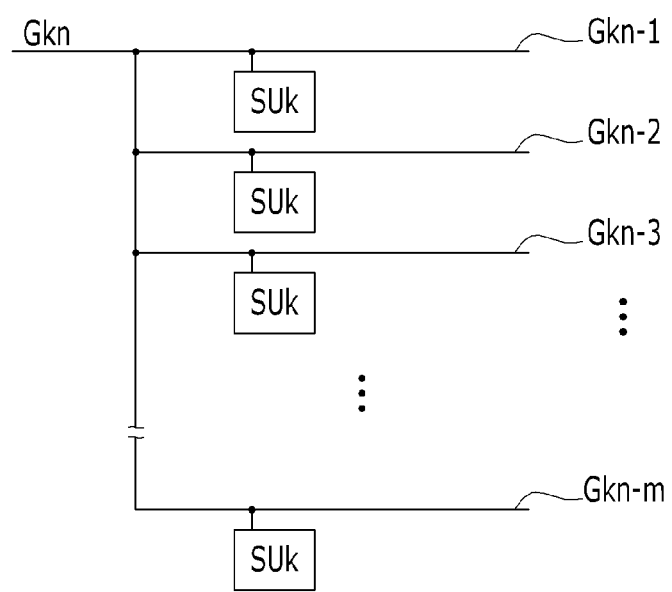
FIG. 19 is a plan view of one gate line included in a display device according to exemplary embodiments of the present invention.

A gate line of the display device will be described with reference to FIG. 19.

The number of the sub-gate lines included in one gate line Gkn of each gate line group may not be limited to two or four as described above and may be expanded by m (m is a natural number of 2 or more). As described above, while each gate line group may be independently derived, as the number of the sub-gate lines included in one gate line Gkn increases, the driving margin of the scan driver 400 may also increase. The number or arrangement of the sensing units SUa, SUb, SUc, and SUd of the sensing unit group SU may not be limited to the above exemplary embodiments and may be changed.

A driving method of the display device will be described with reference to FIG. 20.

Figure 20:
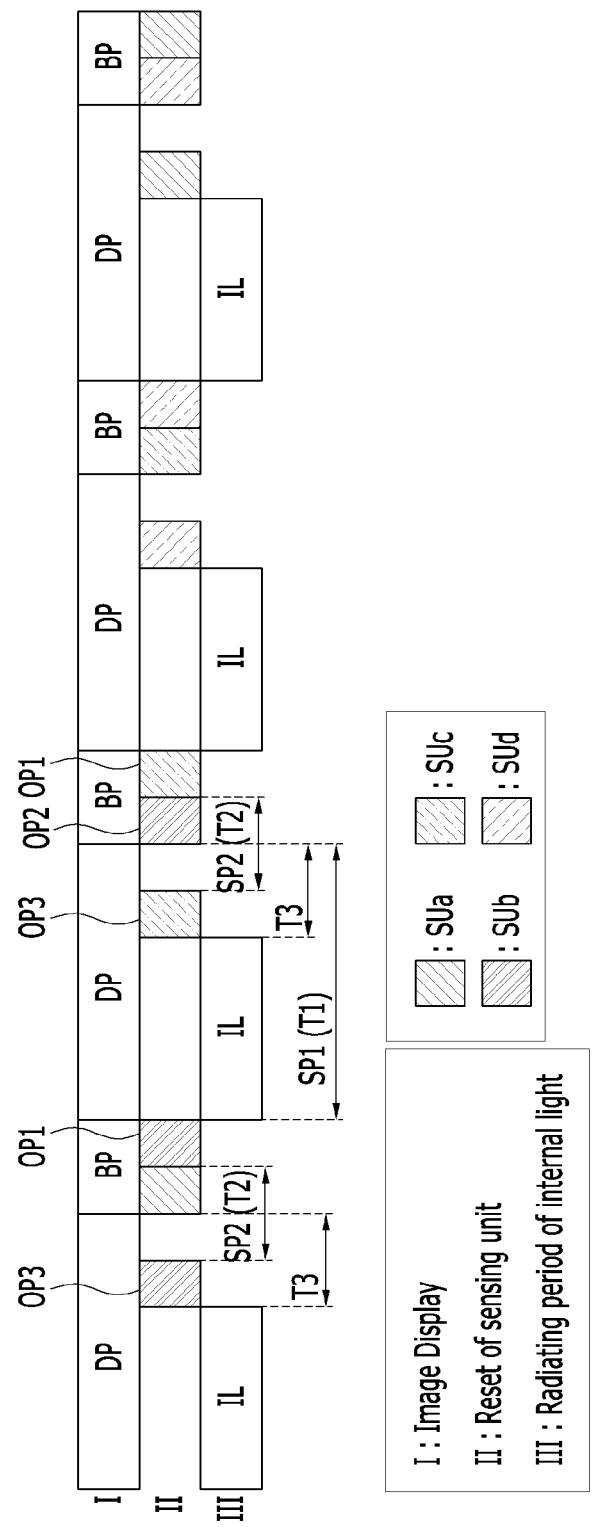
FIG. 20 is a schematic diagram illustrating a displaying operation and a sensing operation of a display device according to exemplary embodiments of the present invention.

FIG. 20 is a schematic diagram illustrating an image displaying operation and a sensing operation of a display device.

The display device may apply gate-on voltage to all image gate lines (not shown) in an image display frame DP in sequence to apply image data voltage corresponding to image information of one screen to a pixel (not shown). A blank period BP may be disposed between two adjacent image display frames DP, and the image of the previous image display frame DP may be maintained during the blank period BP. An image displaying operation of the display device may be performed as noted hereinabove and according to various known technologies in the art.

The sensing units SUa, SUb, SUc, and SUd of the display device may generate light leakage current in the sensing element Qs when light is radiated to the sensing element Qs by a touch of an external object while the switching element Qa is turned off. As a result, a capacitor Cs previously-charged by the reference voltage and applied to the sensing signal lines RO1, RO2, RO3, RO4 may be discharged.

When the touch of the external object is not generated and light is not radiated to the sensing element Qs, the capacitor Cs may not be discharged.

The time periods when a sensing unit SUa, SUb, SUc or SUd generates light leakage current in the sensing element Qs according to light irradiation to the sensing element Qs or not may be referred to as sensing periods SP1 and SP2 (also referred to as "first periods"). The sensing periods SP1 and SP2 may last for a first time T1 and a second time T2, respectively. The second time T2 may be shorter than the first time T1.

When the gate-on voltage is applied to the gate line or sub-gate line connected with the sensing units SUa, SUb, SUc, and SUd, the switching element Qa of the sensing units SUa, SUb, SUc, and SUd may be turned on. The reference voltage applied to the sensing signal lines RO1, RO2, RO3, and RO4 may be transmitted to the capacitor Cs. For example, when the charge voltage of the capacitor Cs is changed by the touch generated during a previous sensing period, the reference voltage may be recharged to the capacitor Cs through the turned-on switching element Qa. Simultaneously, current may be provided to the sensing signal lines RO1, RO2, RO3, and RO4 to generate the sensing signal. When a touch is not generated in the previous step a sensing signal may not be generated. The time period when a sensing signal is not generated may be called a reset period (also, referred to as "second period") OP1, OP2, and OP3 or output periods with respect to one sensing unit SUa, SUb, SUc, or SUd. The reset periods OP1, OP2, and OP3 may last for a third time T3. The third time T3 may or may not be the same with respect to each sensing unit SUa, SUb, SUc, or SUd.

FIG. 20 shows the reset periods OP1, OP2, and OP3 and the sensing periods SP1 and SP2 of the second sensing unit SUb and the third sensing unit SUc.

First, the first reset period OP1 may be set before an internal light IL is radiated from the backlight unit 900 to the display device. For instance, the first reset period OP1 may start before a predetermined time before the internal light IL is radiated from the backlight unit 900 to the display device and may simultaneously end while the internal light IL starts to be radiated.

The first sensing period SP1 of the second sensing unit SUb may last during a radiating period of the internal light IL and may end after the radiating period of the internal light IL ends. In some cases, the first sensing period SP1 may further last for the third time T3. It may be that an external light IL is radiated to the second sensing unit SUb for the third time T3 after the radiating period of the internal light IL ends. The radiating period of the internal light IL may last an entire first sensing period SP1, or, in some cases, for only a part of the first sensing period SP1. The first sensing period SP1 may correspond to the image display frame DP of the display device.

The second reset period OP2 may start after the second sensing period SP2 ends. The voltage of the capacitor Cs charged for the first sensing period SP1 may be provided as the sensing signal in the second reset period OP2. As described above, the contact information during the first sensing period SP1 may be acquired by using the sensing signal.

A noise may occur in the sensing signal due to an effect by the external light IL from the backlight unit 900 during the first sensing period SP1. In order to remove the noise, the sensing units SUa, SUc, and SUd, which may be adjacent or close to the second sensing unit SUb, may be used. The exemplary embodiments shown in FIG. 20 relate to a method of using the third sensing unit SUc.

First, a third reset period OP3 of the third sensing unit SUc may start just after the radiating period of the internal light IL ends. The third reset period OP3 of the third sensing unit SUc may be set within the first sensing period SP1 of the second sensing unit SUb.

The third sensing unit SUc may receive the external light IL during the second sensing period SP2 after the third reset period OP3 of the third sensing unit SUc ends, and may generate the sensing signal. The second sensing period SP2 may last for the second time T2.

The first reset period OP1 for the third sensing unit SUc may start after the second sensing period SP2 ends. After the second reset period OP2 for the second sensing unit SUb ends, the first reset period OP1 of the third sensing unit SUc may start. The first reset period OP1 for the third sensing unit SUc may functionally be equal to the first reset period OP1 for the second sensing unit SUb described above, such that the same reference numeral may be used. Another sensing signal may be provided during the first reset period OP1 of the third sensing unit SUc according to the presence or absence of the external light IL in the second sensing period SP2. When the external light IL is present, the light leakage current may flow in the sensing element Qs of the third sensing unit SUc and accordingly, the sensing signal may be generated.

The third time T3, a time until the second reset period OP2 starts after the internal light IL is turned off for the second sensing unit SUb, may, in some cases, be the same as the second time T2 (e.g., a time duration of the second sensing period SP2 of the third sensing unit SUc). The first reset period OP1 for the third sensing unit SUc may not overlap the second reset period OP2 for the second sensing unit SUb when set after the third reset period for the third sensing unit SUc ends. When the second time T2 is the same as the third time T3 for the third sensing unit SUc, the second reset period OP2 for the second sensing unit SUb and the first reset period OP1 for the third sensing unit SUc may not temporally overlap each other.

When it is assumed that a difference generated in the sensing signal due to the external light IL is mostly irrelevant to the radiating period of the external light IL, and if the sensing signal in the first reset period OP1 for the third sensing unit SUc is subtracted from the sensing signal in the second reset period OP2 for the second sensing unit SUb, it may be assumed that the effect due to the external light IL is substantially removed from the sensing signal for the second sensing unit SUb. Accordingly, the sensing signal, without the effect due to the external light IL, may be acquired and processed to acquire the contact information and/or the exact image of the object.

The gate line connected with each sensing unit SUa, SUb, SUc, and SUd may transmit the gate signal to the different gate clock signals CPV1, CPV2, CPV3, and CPV4, independently, as described above, such that the reset periods OP1, OP2, and OP3 and the sensing periods SP1 and SP2 of each sensing unit SUa, SUb, SUc, or SUd may be separately configured. The gate clock signals CPV1, CPV2, CPV3, and CPV4 controlling the gate line connected to each sensing unit SUa, SUb, SUc, or SUd in the reset periods OP1, OP2, and OP3 may have a periodic clock pulse and constant low voltage may be maintained during the periods other than the reset periods OP1, OP2, and OP3.

A structure of the sensing unit included in the display device will be described with reference to FIG. 21, FIG. 22, FIG. 23, and FIG. 24.

Figure 21:
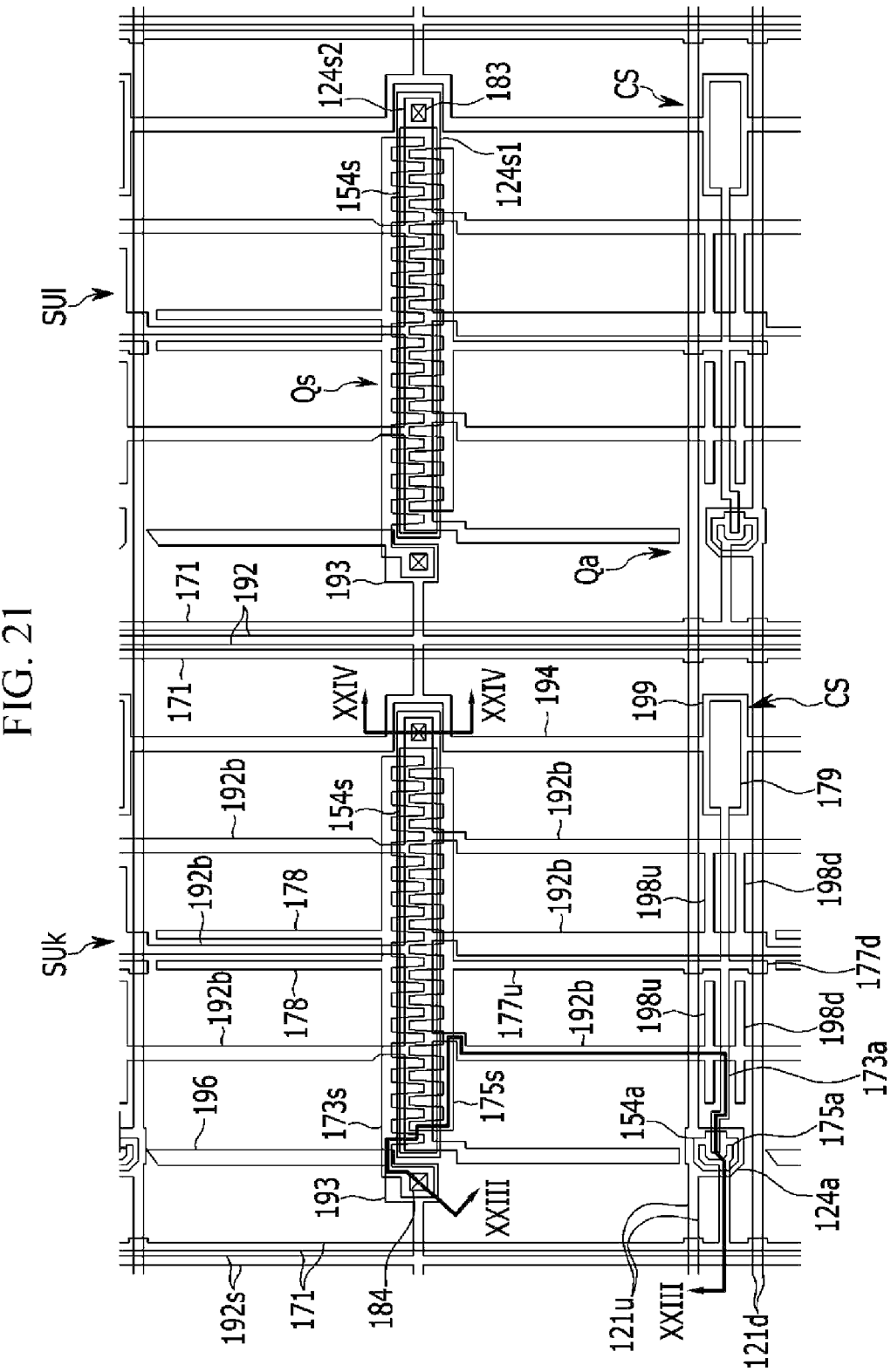
FIG. 21 is a layout view of two sensing elements included in a display device according to exemplary embodiments of the present invention.
Figure 22:
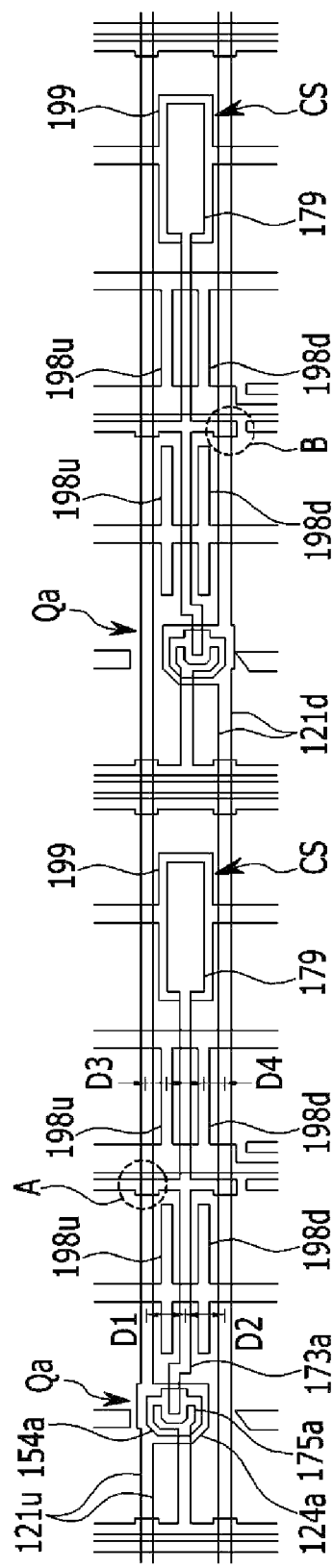
FIG. 22 is a partially enlarged view of two sensing elements included in the display device shown in FIG. 21.
Figure 23:
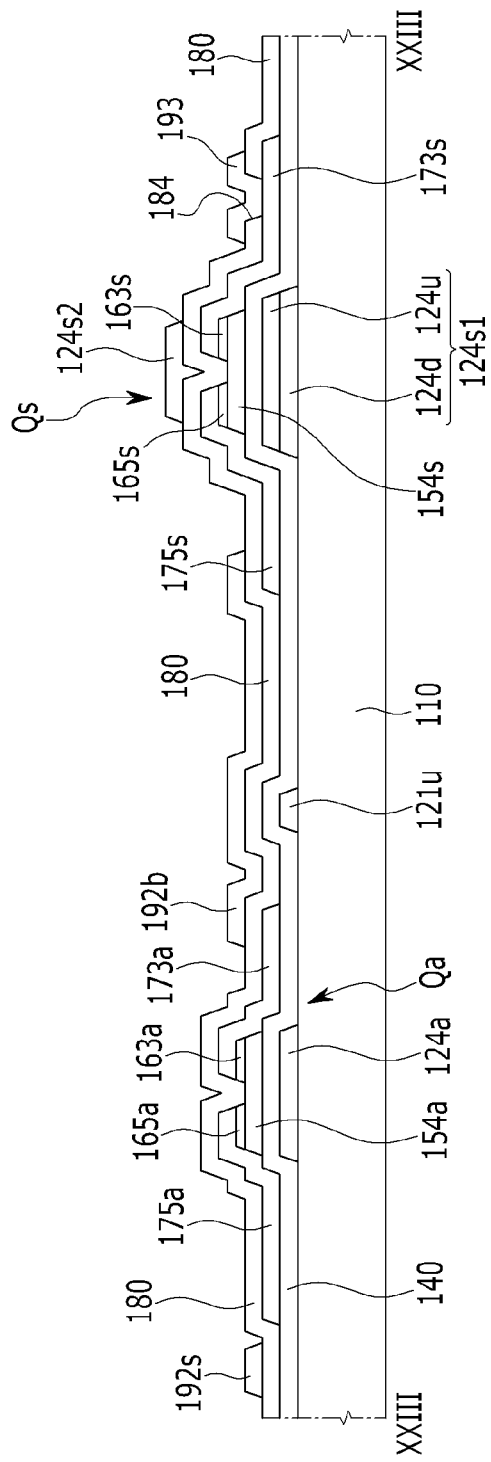
FIG. 23 and FIG. 24 are examples of cross-sectional views of the display device shown in FIG. 21 taken along line XXIII-XXIII and line XXIV-XXIV.
Figure 24:
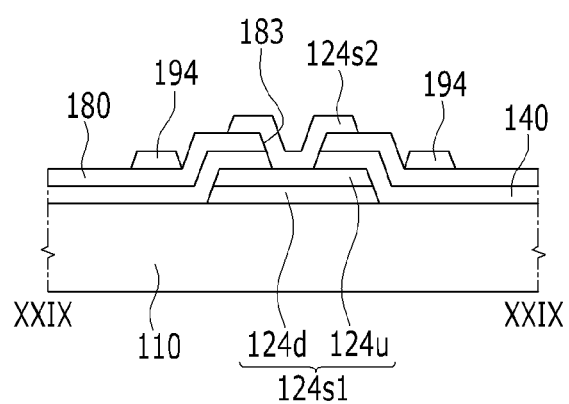

FIG. 21 is a layout view of two sensing elements SUk and SU1 included in a display device. FIG. 22 is a partially enlarged view of two sensing elements included in the display device shown in FIG. 21, and FIG. 23 and FIG. 24 are examples of cross-sectional views of the display device shown in FIG. 21 taken along line XXIII-XXIII and line XXIV-XXIV.

A plurality of pairs of first gate lines 121*u* and second gate lines 121*d* and a plurality of second gate electrodes 124*s*1 may be formed on the insulation substrate 110 made of transparent glass, or plastic. It should be understood that the substrate 110 may be made of any suitable material.

The first gate lines 121*u* and the second gate lines 121*d* may extend in a row direction and may be substantially parallel to each other. The first gate lines 121*u* and the second gate lines 121*d* may belong to different gate line groups and may independently transmit the gate signal as described above. The first gate lines 121*u* and the second gate lines 121*d* may include a plurality of first gate electrodes 124*a*. The first gate electrodes 124*a* of the first gate lines 121*u* may protrude downwards and the first gate electrodes 124*a* of the second gate lines 121*d* may protrude upwards. The first gate electrodes 124*a* of the first gate lines 121*u* and the first gate electrodes 124*a* of the second gate lines 121*d* may belong to the different sensing units SUk and SU1, respectively. For example, the first gate electrodes 124*a* of the first gate lines 121*u* may be disposed at the sensing unit SUk and the first gate electrodes 124*a* of the second gate lines 121*d* may be disposed at the sensing unit SU1 adjacent to the sensing unit SUk in a row direction.

The second gate electrode 124*s*1 may be separated from the first gate lines 121*u* and the second gate lines 121*d* and may have a horizontally elongated island shape. The second gate electrode 124*s*1 may have a multi-layered structure. The second gate electrode 124*s*1 may include a lower layer 124*d* and an upper layer 124*u*. The lower layer 124*d* may include a light blocking layer. The light blocking layer may be a band pass filter (BPF) passing only the light of a predetermined frequency. For example, when the sensing units SUk and SU1 are infrared sensing units, the lower layer 124d, which may be the light blocking layer, may block the visible light and pass only infrared light. The lower layer 124d may have conductivity. Further, the upper layer 124u may be omitted.

The first gate lines 121u, the second gate lines 121d, and the upper layer 124u of the second gate electrode 124s1 may be made of various suitable materials including, but not limited to, aluminum-based metal such as aluminum (Al), an aluminum alloy, silver-based metal such as silver (Ag), a silver alloy, copper-based metal such as copper (Cu), a copper alloy, molybdenum-based metal such as molybdenum (Mo), a molybdenum alloy, chromium (Cr), tantalum (Ta), and titanium (Ti).

A gate insulating layer 140 made of silicon nitride (SiNx) or silicon oxide (SiOx) may be formed on the first gate line 121u, the second gate line 121d, and the second gate electrode 124s1.

A plurality of first and second semiconductor islands 154a and 154s made of hydrogenated amorphous silicon (a-Si), polysilicon, may be formed on the gate insulating layer 140. The first and the second semiconductors 154a and 154s may be disposed on the first and the second gate electrodes 124a and 124s1.

A pair of ohmic contact islands 163a and 165a may be formed on the first semiconductor 154a, and a pair of ohmic contact islands 163s and 165s may be formed on the second semiconductor 154b. The ohmic contacts 163a and 165a may be made of various suitable materials including, for example, silicide or a n+ hydrogenated amorphous silicon on which an n-type impurity may be doped with a high concentration.

A plurality of sensing signal lines 171, a first drain electrode 175a, a first source electrode 173a, a second drain electrode 175s, and a second source electrode 173s may be formed on the ohmic contacts 163a, 165a, 163s, and 165s and the gate insulating layer 140.

The sensing signal lines 171 may transmit the sensing signals and may receive constant reference voltage. The sensing signal lines 171 may extend in a longitudinal direction to cross the first and second gate lines 121u and 121d. Each sensing signal line 171 may include a first drain electrode 175a extending toward the first gate electrode 124a.

The first source electrode 173a may include a horizontal part including one end facing the first drain electrode 175a with respect to the first gate electrode 124a, an extending part 179 disposed at the other end of the horizontal part, a first longitudinal part 177u extending upward from the horizontal part, and a second longitudinal part 177d extending downward from the horizontal part. The horizontal part of the first source electrode 173a may be disposed between the first gate line 121u and the second gate line 121d which may be adjacent to each other. A distance D1 between the horizontal part of the first source electrode 173a and the first gate line 121u and a distance D2 between the horizontal part of the first source electrode 173a and the second gate line 121d may be substantially the same.

The first longitudinal part 177u may overlap the first gate line 121u disposed above and the second longitudinal part 177d may overlap the second gate line 121d disposed below. In the sensing unit SUk connected with the first gate line 121u, when the gate signal transmitted by the first gate line 121u drops from the gate-on voltage to the gate-off voltage, a first kickback voltage may be generated due to parasitic capacitances of the first gate line 121u and the first longitudinal part 177u of the first source electrode 173a, which may be overlapped in a first region A, and may effect the sensing signal. In the sensing unit SU1 connected with the second gate line 121d, when the gate signal transmitted by the second gate line 121d drops from the gate-on voltage to the gate-off voltage, a second kickback voltage may be generated due to parasitic capacitances of the second gate line 121d and the second longitudinal part 177d of the first source electrode 173a which may be overlapped in a second region B, and may effect the sensing signal. For example, the first gate line 121u or the second gate line 121d and the first source electrode 173a may be overlapped in all of two sensing units SUk and SU1 to form the parasitic capacitance, such that the kickback voltages may be equally formed and the first kickback voltage and the second kickback voltage may be substantially the same. Accordingly, there may be no deviation of the sensing signals between the sensing units SUk and SU1 due to the kickback voltage.

The second drain electrode 175s may be connected with the second longitudinal part 177u of the first source electrode 173a. The second drain electrode 175s may face the second source electrode 173s with respect to the second gate electrode 124s1. The second drain electrode 175s and the second source electrode 173s may have a comb shape and be attached to each other.

The second source electrode 173s may include a third longitudinal part 178 stretched upward from a portion where the second gate electrode 124s1 is disposed. The third longitudinal part 178 may be provided as a pair of longitudinal parts, as shown in FIG. 21.

The first gate electrode 124a, the first source electrode 173a, and the first drain electrode 175a may form a first thin film transistor (TFT) Qa together with the first semiconductor 154a and may correspond to the switching element Qa described above.

A passivation layer 180 may be formed on the sensing signal line 171, the first source electrode 175a, the second drain electrode 175s, the second source electrode 173s, and an exposed portion of the semiconductors 154a and 154s.

A plurality of contact holes 184 exposing a part of the second source electrode 173s may be formed on the passivation layer 180 and a plurality of contact holes 183 exposing the upper layer 124u or the lower layer 124d of the second gate electrode 124s1 may be formed on the passivation layer 180 and the gate insulating layer 140.

A plurality of source voltage lines 192s (first voltage lines) transmitting the source voltage Vs described above and a plurality of bias voltage lines 192b (second voltage lines) transmitting a bias voltage Vb may be formed on the passivation layer 180.

The source voltage lines 192s and the bias voltage lines 192b may extend in a longitudinal direction and may cross the first gate line 121u and the second gate line 121d.

The source voltage line 192s may be disposed between two sensing units SUk and SU1 adjacent to each other in a row direction. The source voltage line 192s may include a horizontal part crossing two sensing signal lines 171 just adjacent to each other, a first longitudinal part 196 extending upwards from a right end of the horizontal part and disposed at the right sensing unit SU1, and a second longitudinal part 194 extending upwards and downwards from the left end of the horizontal part and disposed at the left sensing unit SUk. The second longitudinal part 194 stretches in a longitudinal direction and may pass a plurality of sensing units adjacent to each other in a column direction. The second longitudinal part 194 may include an expanding unit 199 overlapping the expanding unit 179 of the first source electrode 173a with the passivation layer 180 disposed therebetween. The expanding unit 179 and the expanding unit 199 overlapping each other with the passivation layer 180 disposed therebetween may correspond to the capacitor Cs. The expanding unit 179 of the first source electrode 173a and the expanding unit 199 of the source voltage line 192s may be disposed between the first and second gate lines 121u and 121d, which may be adjacent to each other.

The source voltage line 192s may be connected to the second source electrode 173s through the contact hole 184 and may transmit the source voltage Vs to the second source electrode 173s.

The bias voltage line 192b may include a plurality of vertical parts disposed below or above the second thin film transistor Qs. The bias voltage line 192b may include a third gate electrode 124s2 facing the second gate electrode 124s1 with respect to the second semiconductor 154s. The third gate electrode 124s2 may be stretched in a horizontal direction like the second gate electrode 124s1. The plurality of longitudinal parts of the bias voltage line 192b may have symmetry with respect to the third gate electrode 124s2.

The bias voltage line 192b may include a first dummy electrode 198u and a second dummy electrode 198d which may be disposed between the first gate line 121u and the second gate line 121d which may be adjacent to each other.

The first dummy electrode 198u may be disposed between the horizontal part of the first source electrode 173a and the first gate line 121u and may be horizontally stretched to be parallel to the first gate line 121u. A distance between the first dummy electrode 198u and the first source electrode 173a and a distance between the first dummy electrode 198u and the first gate line 121u may be the same.

The second dummy electrode 198d may be disposed between the horizontal part of the first source electrode 173a and the second gate line 121d and may be horizontally stretched to be parallel to the second gate line 121d. A distance between the second dummy electrode 198d and the first source electrode 173a and a distance between the first dummy electrode 198u and the second gate line 121d may be the same.

A distance D3 between the first gate line 121u and the first dummy electrode 198u and a distance D4 between the second gate line 121d and the second dummy electrode 198d may be substantially the same. The first dummy electrode 198u and the second dummy electrode 198d may have symmetry with respect to the horizontal part of the first source electrode 173a. The first dummy electrode 198u and the second dummy electrode 198d may connect two adjacent longitudinal parts of the bias voltage line 192b and may be connected to one longitudinal part. When the dummy electrodes 198u and 198d are formed, the parasite capacitance among the first gate line 121u, the second gate line 121d, and the first source electrode 173a may be reduced and signal interference may be reduced, such that it may be possible to prevent the noise of the sensing signal.

The bias voltage line 192b may be connected to the second gate electrode 124s1 through the contact hole 183 to transmit the bias voltage Vb to the second gate electrode 124s1.

The second gate electrode 124s1, the third gate electrode 124s2, the second source electrode 173s, and the second drain electrode 175s form the second thin film transistor Qs together with the second semiconductor 154s and may correspond to the sensing element Qs.

The source voltage line 192s and the bias voltage line 192b may be made of transparent conductive materials.

A structure of the sensing unit included in the display device is described with reference to FIG. 25. The same reference numerals designate the same constituent elements and a duplicate description is omitted to avoid repetition.

Figure 25:
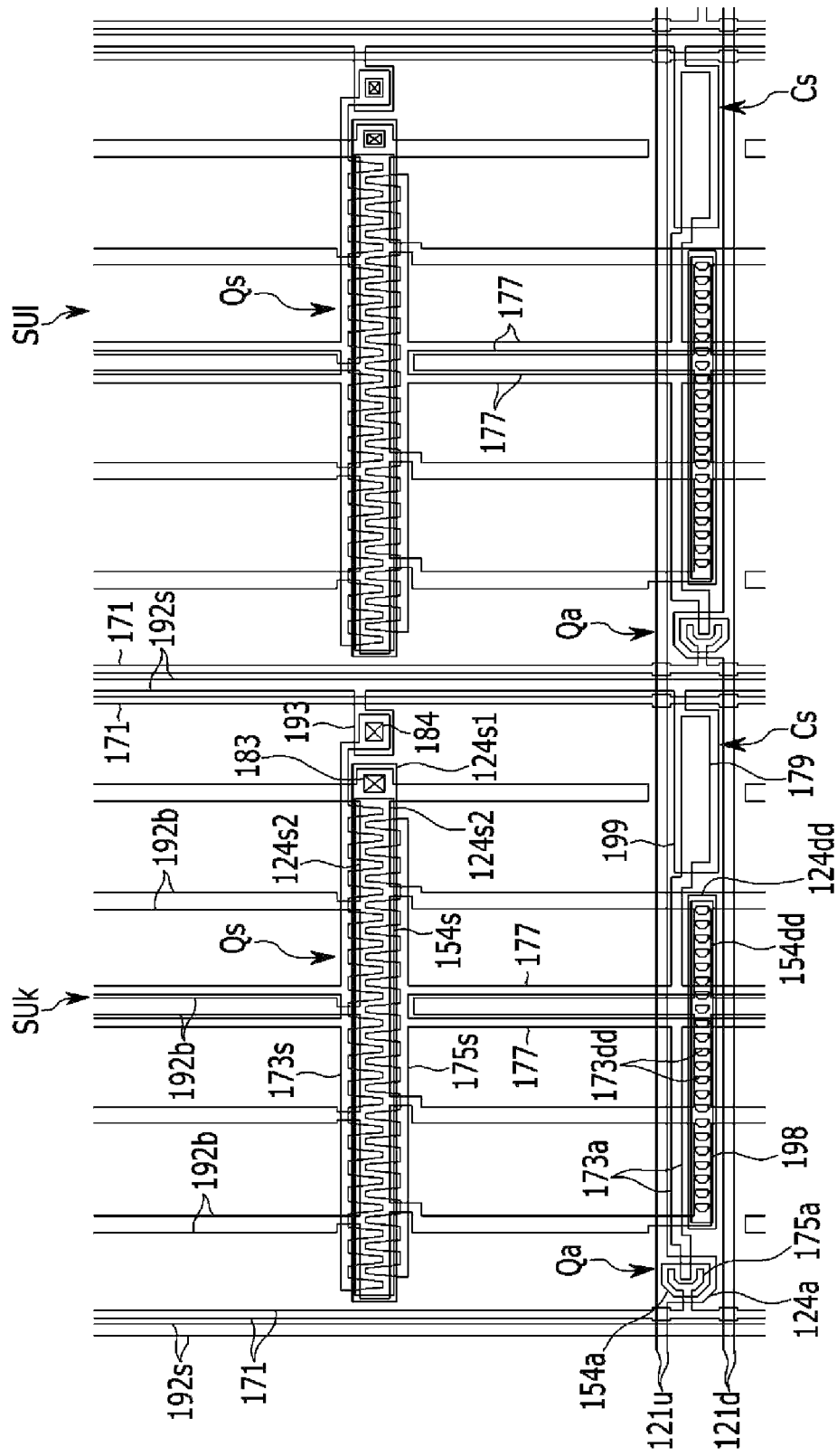
FIG. 25 is a layout view of two sensing elements included in a display device according to exemplary embodiments of the present invention.

FIG. 25 is a layout view of two sensing elements included in a display device.

Since the display device is similar to the device shown in FIG. 21, FIG. 22, FIG. 23, and FIG. 24, a description of similar components and elements will be omitted and the differences will be described.

The first source electrode 173a in the display device may include a horizontal part and a pair of longitudinal parts 177 extending upwards from the horizontal part. The pair of longitudinal parts 177 may face each other with one longitudinal part of the bias voltage line 192b in between the pair of longitudinal parts 177. The horizontal part of the first source electrode 173a may be disposed to be closer to the first gate line 121u, which is disposed at the upper portion of the first gate line 121u and the second gate line 121d.

Dummy patterns 124dd, 154dd, and 173dd may be formed between the horizontal part of the first source electrode 173a and the second gate line 121d. The dummy patterns 124dd, 154dd, and 173dd may include a dummy gate electrode 124dd disposed at the same layer as the first gate line 121u and the second gate line 121d, a dummy semiconductor 154dd disposed at the same layer as the first semiconductor 154a and the second semiconductor 154s, and a dummy conductor 173dd disposed at the same layer as the sensing signal line 171. In some cases, at least one of the dummy gate electrode 124dd, the dummy semiconductor 154dd, and the dummy conductor 173dd may be omitted. The dummy patterns 124dd, 154dd, and 173dd may be formed in order to reduce a step in the vicinity of a position where the first gate line 121u and the second gate line 121d are disposed, and may be formed to horizontally stretch along the first gate line 121u and the second gate line 121d. The dummy conductor 173dd may be formed in a plurality of islands.

The source voltage line 192s may include only one longitudinal part stretching in a longitudinal direction and may be connected with the second source electrode 173s through the contact hole 184.

A plurality of longitudinal parts disposed with respect to the second thin film transistor Qs among the plurality of longitudinal parts of the bias voltage line 192b may be connected with each other through the horizontal part 198. The horizontal part 198 of the bias voltage line 192b may cover the dummy patterns 124dd, 154dd, and 173dd.

In the exemplary embodiments shown in FIG. 21, FIG. 22, FIG. 23, FIG. 24, and FIG. 25, each sensing unit SUk or SU1 may have a structure having bilateral inversion symmetry. The switching element Qa or the first thin film transistor Qa included in each sensing unit SUk or SU1 may be disposed at not the left but the right.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
 a plurality of sensing unit groups, each sensing unit group comprising at least three sensing units that are arranged adjacently with each other;
 a plurality of gate lines connected to a first plurality of sensing units of a first sensing unit group;
 at least one sensing signal line connected to the first plurality of sensing units;

a scan driver configured to transmit gate signals to the plurality of gate lines, respectively; and a sensing signal processor configured to process a sensing signal received from the at least one sensing signal line, wherein the scan driver is configured to transmit the gate signals to the plurality of gate lines connected to the first plurality of sensing units according to different at least three gate clock signals, wherein:

the first sensing unit group comprises a first sensing unit and a second sensing unit connected to different sub-gate lines;

the first sensing unit is configured to provide a first sensing signal during a first reset period and to provide a second signal during a second reset period after sensing light during a first sensing period; and the second sensing unit is configured to provide a third sensing signal during a third reset period disposed within the first sensing period and to provide a fourth sensing signal during a fourth reset period after sensing light during a second sensing period.

2. The display device of claim 1, wherein:

the first sensing unit group comprises four sensing units arranged in a quadrangular form; and the plurality of gate lines comprises four gate lines connected to the four sensing units, respectively.

3. The display device of claim 2, wherein:

the four gate lines are arranged two by two every sensing unit row.

4. The display device of claim 3, wherein:

each sensing unit comprises a switching element connected to a gate line and a sensing signal line, and a sensing element and a capacitor connected to the switching element;

a control terminal of the sensing element is configured to receive a bias voltage; and an input terminal of the sensing element and the capacitor are configured to receive a source voltage.

5. The display device of claim 4, further comprising:

a backlight unit to radiate light to the plurality of sensing unit groups, wherein the plurality of sensing units are configured to sense the radiated light from the backlight unit.

6. The display device of claim 1, further comprising:

a backlight unit to radiate light to the plurality of sensing unit groups during a part of the first sensing period.

7. A display device, comprising:

a plurality of sensing unit groups comprising a first sensing unit group and a second sensing unit group, each sensing unit group comprising a plurality of sensing units;

a plurality of gate lines, one of which comprising a first sub-gate line and a second sub-gate line connected to each other;

at least one sensing signal line connected to the sensing units of the first sensing unit group and the second sensing unit group;

a scan driver configured to transmit gate signals to the plurality of gate lines, respectively; and a sensing signal processor configured to process a sensing signal received from the at least one sensing signal line, wherein the plurality of gate lines is configured to transmit the gate signals according to different gate clock signals from each other, wherein the first sub-gate line is connected to one of the plurality of sensing units of the first sensing unit group, and wherein the second sub-gate line is connect to one of the plurality of sensing units of the second sensing unit group.

8. The display device of claim 7, wherein:

an arrangement of the plurality of sensing units of the first sensing unit group and an arrangement of the plurality of sensing units of the second sensing unit group are different from each other.

9. The display device of claim 8, wherein:

the first sensing unit group and the second sensing unit group are alternately disposed in a column direction.

10. The display device of claim 8, wherein:

a number of the at least one sensing signal line is at least two;

the first sensing unit group comprises a first sensing unit connected to the first sub-gate line;

the second sensing unit group comprises a second sensing unit connected to the second sub-gate line; and the first sensing unit and the second sensing unit are connected to different sensing signal lines.

11. The display device of claim 10, wherein:

the sensing signal processor is configured to receive sensing signals according to an arrangement order of the sensing signal lines in a row direction for sensing units connected to the same gate line and to rearrange data of the received sensing signals according to an arrangement order of the sensing units in a column direction.

12. The display device of claim 7, wherein:

at least one of the plurality of sensing unit groups comprises four sensing units arranged in a quadrangular form;

the plurality of gate lines comprises four gate lines respectively connected with the four sensing units; and two sensing unit rows are disposed between the first and second sub-gate lines.

13. A display device, comprising:

a plurality of sensing unit groups, each sensing unit group comprising at least three sensing units that are arranged adjacently with each other;

a plurality of gate lines connected to a first plurality of sensing units of a first sensing unit group;

at least one sensing signal line connected to the first plurality of sensing units;

a scan driver configured to transmit gate signals to the plurality of gate lines, respectively; and a sensing signal processor configured to process a sensing signal received from the at least one sensing signal line, wherein the scan driver is configured to transmit the gate signals to the plurality of gate lines connected to the first plurality of sensing units according to different at least three gate clock signals, wherein:

each sensing unit comprises a switching element connected to a gate line and a sensing signal line, and a sensing element and a capacitor connected to the switching element;

a control terminal of the sensing element is connected to a bias voltage line; and an input terminal of the sensing element and the capacitor are connected to a source voltage line, and wherein:

the plurality of gate lines comprises a first gate line and a second gate line connected to the switching elements of different sensing units of the first sensing unit group and adjacent to each other;

the first gate line and the second gate line extend in a row direction;

the bias voltage line is disposed in an upper layer than the first gate line and the second gate line; and the bias voltage line comprises a dummy electrode disposed between the first gate line and the second gate line adjacent to the first gate line.

14. The display device of claim 13, wherein the dummy electrode comprises:
a first dummy electrode disposed between the first gate line and an input terminal of the switching element; and
a second dummy electrode disposed between the second gate line and the input terminal of the switching element.

15. A display device, comprising:
a substrate;
a first gate line and a second gate line extending in a first direction and disposed on the substrate;
a first sensing unit and a second sensing unit that are arranged in the first direction; and
first and second sensing signal lines crossing the first and second gate lines and transmitting sensing signals from the first and second sensing units, respectively,
wherein
the first sensing unit includes a first transistor including a first gate electrode connected to the first gate line, a first drain electrode connected to the first sensing signal line, and a first source electrode opposing the first drain electrode,
the second sensing unit includes a second transistor including a second gate electrode connected to the second gate line, a second drain electrode connected to the second sensing signal line, and a second source electrode opposing the second drain electrode,
the first source electrode includes a portion overlapping both the first gate line and the second gate line, and the second source electrode includes a portion overlapping both the first gate line and the second gate line.

16. The display device of claim 15, further comprising:
a third drain electrode connected to the first source electrode;
a third gate electrode separated from the first gate line and the second gate line;
a third source electrode facing the second drain electrode;
a bias voltage line connected to the third gate electrode; and
a source voltage line connected to the third source electrode,
wherein the bias voltage line comprises a dummy electrode disposed between the first source electrode and at least one of the first gate line and the second gate line.

17. The display device of claim 16, wherein:
the source voltage line and the bias voltage line are disposed on the first and second sensing signal lines and the first and second source electrodes.

18. The display device of claim 17, wherein:
the bias voltage line further comprises a fourth gate electrode facing the third gate electrode.

19. The display device of claim 16, wherein:
the third gate electrode comprises two layers; and
at least one of the two layers comprises a light blocking film.

20. A driving method of a display device comprising a plurality of sensing unit groups including a first sensing unit group and a second sensing unit group and at least one sensing signal line, each sensing unit group comprising a plurality of sensing units disposed adjacent to each other, the at least one sensing signal line being connected to the sensing units of the first sensing unit group and the second sensing unit group, the method comprising:

resetting each of the sensing units of the first sensing unit group by transmitting, to a plurality of gate lines, a plurality of gate signals, wherein each of the plurality of gate signals is independently generated according to different gate clock signals; and
detecting light via the first plurality of sensing units of the first sensing unit group to sense light,
wherein a gate line of the plurality of gate lines comprises a first sub-gate line and a second sub-gate line connected with each other,
the first sub-gate line is connected to one of the plurality of sensing units of the first sensing unit group, and
the second sub-gate line is connect to one of the plurality of sensing units of the second sensing unit group.

21. The driving method of claim 20, wherein:
an arrangement of the sensing units of the first sensing unit group and an arrangement of the sensing units of the second sensing unit group are different.

22. The driving method of claim 21, wherein:
a number of the at least one sensing signal line is at least two;
the first sensing unit group comprises a first sensing unit connected to the first sub-gate line;
the second sensing unit group comprises a second sensing unit connected to the second sub-gate line; and
the first sensing unit and the second sensing unit are connected to different sensing signal lines.

23. The driving method of claim 22, wherein:
receiving, via a sensing signal processor, a sensing signal according to an arrangement order of the at least one sensing signal line in a row direction; and
rearranging data of the received sensing signals according to an arrangement order of the sensing units in a column direction.

24. The driving method of claim 20, wherein:
resetting each of the sensing units of the first sensing unit group comprises transmitting a sensing signal to the at least one sensing signal line by the sensing unit.

25. The driving method of claim 24, wherein:
the first sensing unit group comprises a first sensing unit connected to a first gate line and a second sensing unit connected to a second gate line; and
resetting each of the sensing units of the first sensing unit group and detecting light comprises:
resetting the first sensing unit during a first reset period;
detecting, via the first sensing unit, light during a first sensing period after the first reset period ends;
resetting the first sensing unit during a second reset period after the first sensing period ends;
resetting the second sensing unit during a third reset period within the first sensing period;
detecting, via the second sensing unit, light during a second sensing period after the third reset period ends; and
resetting the second sensing unit during a fourth reset period after the second sensing period ends.

26. The driving method of claim 25, further comprising:
radiating, using a backlight unit, light after the resetting of the first sensing unit during the first reset period and before the resetting of the second sensing unit during the third reset period.

27. The driving method of claim 26, wherein:
the backlight unit does not radiate light during the second sensing period.

28. The driving method of claim 27, wherein:
the fourth reset period for the second sensing unit and the second reset period for the first sensing unit do not temporally overlap.

29. The driving method of claim 20, wherein:
resetting each of the sensing units of the first sensing unit group comprises providing a sensing signal.

* * * * *